United States Patent
Wagner et al.

(10) Patent No.: US 10,646,991 B2
(45) Date of Patent: May 12, 2020

(54) SYSTEMS AND METHODS FOR PROCESSING OBJECTS, INCLUDING AUTOMATED PROCESSING

(71) Applicant: Berkshire Grey, Inc., Lexington, MA (US)

(72) Inventors: Thomas Wagner, Concord, MA (US); Kevin Ahearn, Fort Mill, SC (US); John Richard Amend, Jr., Belmont, MA (US); Benjamin Cohen, Somerville, MA (US); Michael Dawson-Haggerty, Pittsburgh, PA (US); William Hartman Fort, Stratham, NH (US); Christopher Geyer, Arlington, MA (US); Victoria Hinchey, Winchester, MA (US); Jennifer Eileen King, Oakmont, PA (US); Thomas Koletschka, Cambridge, MA (US); Michael Cap Koval, Pittsburgh, PA (US); Kyle Maroney, North Attleboro, MA (US); Matthew T. Mason, Pittsburgh, PA (US); William Chu-Hyon McMahan, Cambridge, MA (US); Gene Temple Price, Cambridge, MA (US); Joseph Romano, Somerville, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

(*) Notice: Subject to any disclaimer, the term of this patent is extended or adjusted under 35 U.S.C. 154(b) by 0 days.

(21) Appl. No.: 15/935,835

(22) Filed: Mar. 26, 2018

(65) Prior Publication Data
US 2018/0273298 A1 Sep. 27, 2018

Related U.S. Application Data

(60) Provisional application No. 62/476,310, filed on Mar. 24, 2017.

(51) Int. Cl.
*B25J 9/00* (2006.01)
*B65G 47/82* (2006.01)
(Continued)

(52) U.S. Cl.
CPC .......... *B25J 9/0093* (2013.01); *B25J 9/1615* (2013.01); *B65G 1/0464* (2013.01);
(Continued)

(58) Field of Classification Search
CPC ..................................................... B25J 9/0093
See application file for complete search history.

(56) References Cited

U.S. PATENT DOCUMENTS

| 4,722,653 | A | 2/1988 | Williams et al. |
| 4,846,335 | A | 7/1989 | Hartlepp |

(Continued)

FOREIGN PATENT DOCUMENTS

| AU | 2006204322 A1 | 8/2006 |
| AU | 2006204622 A1 | 3/2007 |

(Continued)

OTHER PUBLICATIONS

International Search Report & Written Opinion issued by International Searching Authority in related International Patent Application PCT/US2018/024335 dated Jun. 29, 2018, 14 pgs.

(Continued)

*Primary Examiner* — Thomas Randazzo
(74) *Attorney, Agent, or Firm* — Gesmer Updegrove LLP

(57) ABSTRACT

A processing system for processing objects using a programmable motion device is disclosed. The processing system includes a plurality of supply bins providing supply of a plurality of objects, with the plurality of supply bins being provided with a bin conveyance system, a programmable motion device in communication with the bin conveyance system, where the programmable motion device includes an end effector for grasping and moving a selected object out of a selected supply bin, and a movable carriage for receiving the selected object from the end effector of the program-
(Continued)

mable motion device, and for carrying the selected object to one of a plurality of destination containers.

33 Claims, 24 Drawing Sheets

(51) Int. Cl.
  *B65G 1/137* (2006.01)
  *G06Q 10/08* (2012.01)
  *B65G 1/04* (2006.01)
  *B65G 47/90* (2006.01)
  *B25J 9/16* (2006.01)

(52) U.S. Cl.
  CPC ......... *B65G 1/1371* (2013.01); *B65G 1/1376* (2013.01); *B65G 1/1378* (2013.01); *B65G 47/82* (2013.01); *B65G 47/905* (2013.01); *G06Q 10/087* (2013.01); *B65G 2201/0258* (2013.01); *G06Q 10/08* (2013.01)

(56) References Cited

U.S. PATENT DOCUMENTS

| | | | |
|---|---|---|---|
| 4,895,242 A | 1/1990 | Michel | |
| 5,190,162 A | 3/1993 | Hartlepp | |
| 5,595,263 A | 1/1997 | Pignataro | |
| 5,794,788 A | 8/1998 | Massen | |
| 5,839,566 A | 11/1998 | Bonnet | |
| 6,059,092 A | 5/2000 | Jerue et al. | |
| 6,208,908 B1 | 3/2001 | Boyd et al. | |
| 6,246,023 B1 | 6/2001 | Kugle | |
| 6,323,452 B1 | 11/2001 | Bonnet | |
| 6,377,867 B1* | 4/2002 | Bradley | B65G 1/1376 |
| | | | 700/216 |
| 6,390,756 B1 | 5/2002 | Isaacs et al. | |
| 6,401,936 B1 | 6/2002 | Isaacs et al. | |
| 6,579,053 B1 | 6/2003 | Grams et al. | |
| 6,688,459 B1 | 2/2004 | Bonham et al. | |
| 6,762,382 B1* | 7/2004 | Danelski | B07C 5/36 |
| | | | 198/370.04 |
| 6,897,395 B2 | 5/2005 | Shiibashi et al. | |
| 7,728,244 B2 | 6/2010 | De Leo et al. | |
| 8,776,694 B2 | 7/2014 | Rosenwinkel et al. | |
| 9,102,336 B2 | 8/2015 | Rosenwinkel | |
| 9,346,083 B2 | 5/2016 | Stone | |
| 9,364,865 B2 | 6/2016 | Kim | |
| 9,481,518 B2 | 11/2016 | Neiser | |
| 9,751,693 B1* | 9/2017 | Battles | G06Q 10/087 |
| 9,878,349 B2 | 1/2018 | Crest et al. | |
| 9,926,138 B1 | 3/2018 | Brazeau et al. | |
| 9,962,743 B2 | 5/2018 | Bombaugh et al. | |
| 9,975,148 B2 | 5/2018 | Zhu et al. | |
| 2002/0092801 A1 | 7/2002 | Dominguez | |
| 2002/0157919 A1 | 10/2002 | Sherwin | |
| 2002/0179502 A1 | 12/2002 | Cerutti et al. | |
| 2003/0038065 A1 | 2/2003 | Pippin et al. | |
| 2006/0045672 A1* | 3/2006 | Maynard | B25J 5/02 |
| | | | 414/276 |
| 2006/0070929 A1 | 4/2006 | Fry et al. | |
| 2007/0209976 A1 | 9/2007 | Worth et al. | |
| 2008/0113440 A1* | 5/2008 | Gurney | G01N 1/312 |
| | | | 436/48 |
| 2008/0181753 A1* | 7/2008 | Bastian | B65G 1/026 |
| | | | 414/277 |
| 2009/0047178 A1* | 2/2009 | Chojnacki | G01N 35/026 |
| | | | 422/65 |
| 2010/0122942 A1 | 5/2010 | Harres et al. | |
| 2010/0318216 A1 | 12/2010 | Faivre et al. | |
| 2011/0144798 A1 | 6/2011 | Freudelsperger | |
| 2011/0243707 A1 | 10/2011 | Dumas et al. | |
| 2012/0118699 A1 | 5/2012 | Buchmann et al. | |
| 2013/0110280 A1 | 5/2013 | Folk | |
| 2014/0086709 A1* | 3/2014 | Kasai | B65G 63/004 |
| | | | 414/140.3 |
| 2014/0086714 A1 | 3/2014 | Malik | |
| 2014/0244026 A1* | 8/2014 | Neiser | B65G 1/1373 |
| | | | 700/216 |
| 2015/0073589 A1 | 3/2015 | Khodl et al. | |
| 2015/0098775 A1 | 4/2015 | Razumov | |
| 2016/0221762 A1 | 8/2016 | Schroader | |
| 2016/0228921 A1 | 8/2016 | Doublet et al. | |
| 2016/0244262 A1* | 8/2016 | O'Brien | B65G 1/1373 |
| 2016/0347545 A1 | 12/2016 | Lindbo et al. | |
| 2017/0043953 A1 | 2/2017 | Battles et al. | |
| 2017/0136632 A1 | 5/2017 | Wagner et al. | |
| 2017/0157648 A1 | 6/2017 | Wagner et al. | |
| 2017/0157649 A1 | 6/2017 | Wagner et al. | |
| 2017/0349385 A1 | 12/2017 | Moroni et al. | |
| 2018/0085788 A1* | 3/2018 | Engel | B07C 1/025 |
| 2019/0022702 A1* | 1/2019 | Vegh | B07C 5/10 |

FOREIGN PATENT DOCUMENTS

| | | | | |
|---|---|---|---|---|
| DE | 957200 C | 1/1957 | | |
| DE | 19510392 A1 | 9/1996 | | |
| DE | 102004001181 A1 | 8/2005 | | |
| DE | 102004013353 A1 | 10/2005 | | |
| DE | 102005061309 A1 | 7/2007 | | |
| DE | 102007023909 A1 | 11/2008 | | |
| DE | 102007038834 A | 2/2009 | | |
| DE | 102010002317 A1 | 8/2011 | | |
| DE | 102012102333 A1 | 9/2013 | | |
| EP | 0613841 A1 | 7/1994 | | |
| EP | 1995192 A2 | 11/2008 | | |
| EP | 2233400 A1 | 9/2010 | | |
| EP | 2650237 A1 * | 10/2013 | ........... | B65G 1/1378 |
| EP | 2650237 A1 | 10/2016 | | |
| EP | 3112295 A1 | 1/2017 | | |
| GB | 2084531 A | 4/1982 | | |
| JP | S63310406 A | 10/1979 | | |
| JP | S63310406 A | 12/1988 | | |
| JP | H0395001 A | 4/1991 | | |
| JP | 2002028577 A | 1/2002 | | |
| JP | 2003150230 A | 5/2003 | | |
| JP | 2007182286 A | 7/2007 | | |
| JP | 2008037567 A | 2/2008 | | |
| JP | 2010202291 A | 9/2010 | | |
| JP | 2014141313 A | 8/2014 | | |
| WO | 2005118436 A1 | 12/2005 | | |
| WO | 2007009136 A1 | 1/2007 | | |
| WO | 2010017872 A1 | 2/2010 | | |
| WO | 2010034044 A2 | 4/2010 | | |
| WO | 2011038442 A2 | 4/2011 | | |
| WO | 2012024714 A2 | 3/2012 | | |
| WO | 2015118171 A1 | 8/2015 | | |
| WO | 2016198565 A1 | 12/2016 | | |
| WO | 2017044747 A1 | 3/2017 | | |

OTHER PUBLICATIONS

International Preliminary Report on Patentability issued by the International Searching Authority, the European Patent Office, in related International Patent Application PCT/US2018/024335 dated Oct. 3, 2019, 10 pgs.

Communication pursuant to Rules 161(1) and 162 EPC issued by the European Patent Office in related European Patent Application No. 18719343.8 dated Oct. 31, 2019, 3 pages.

* cited by examiner

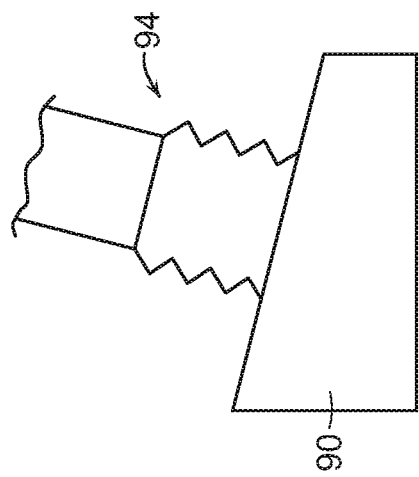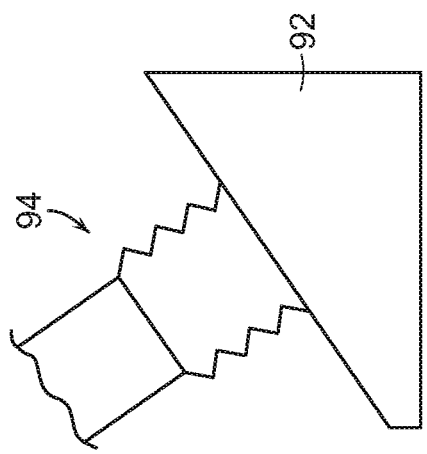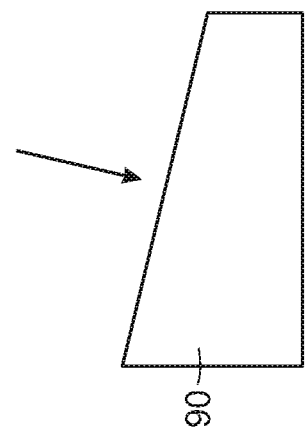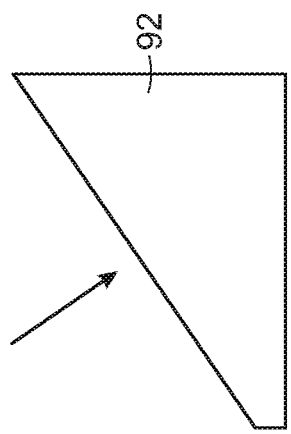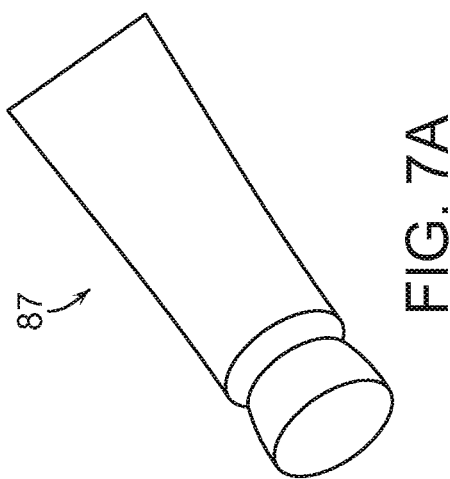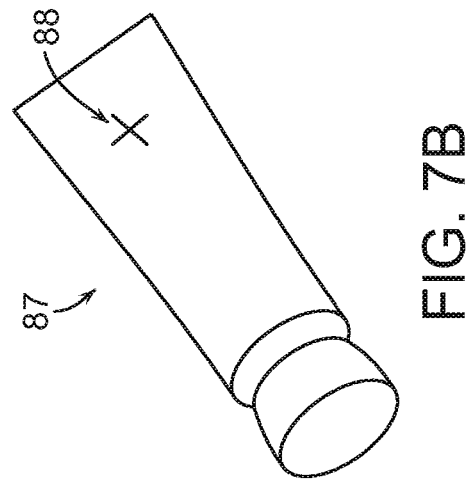

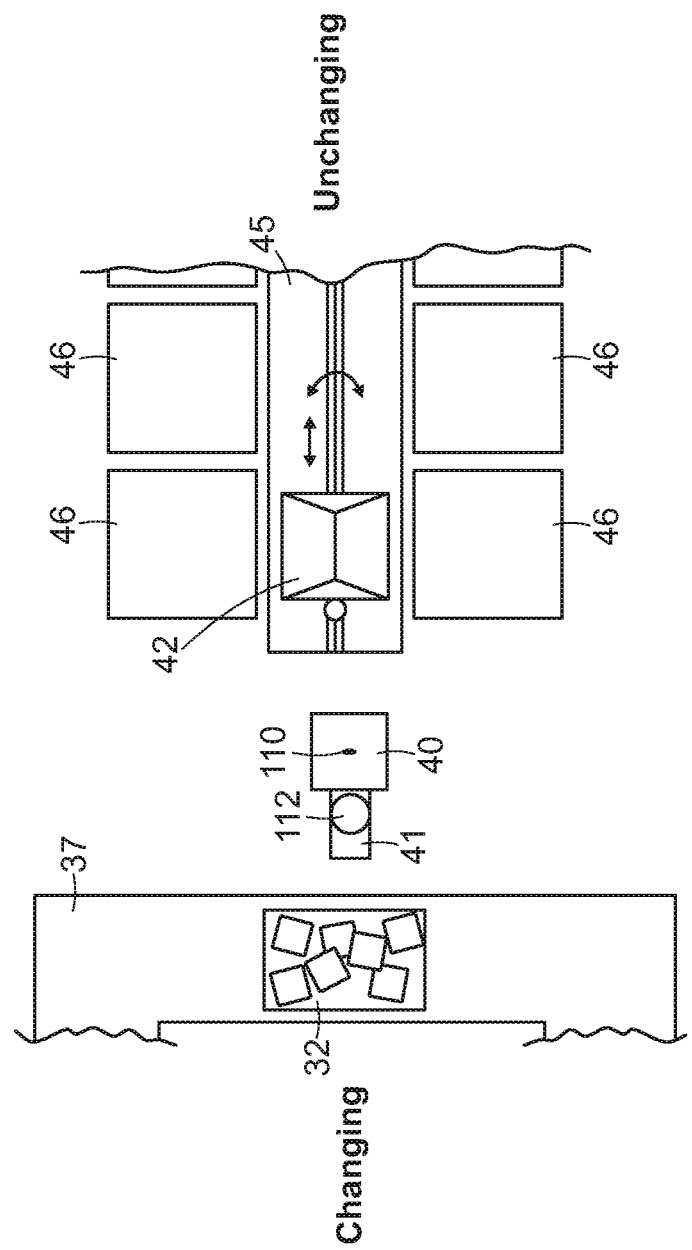

SYSTEMS AND METHODS FOR PROCESSING OBJECTS, INCLUDING AUTOMATED PROCESSING

PRIORITY

The present application claims priority to U.S. Provisional Patent Application Ser. No. 62/476,310 filed Mar. 24, 2017, the disclosure of which is hereby incorporated by reference in its entirety.

BACKGROUND

The invention generally relates to automated programmable motion control systems, e.g., robotic, sortation and other processing systems, and relates in particular to programmable motion control systems intended for use in environments requiring that a variety of objects (e.g., articles, packages, consumer products etc.) be processed and moved to a number of processing destinations.

Many object distribution systems, for example, receive objects in a disorganized stream or bulk transfer that may be provided as individual objects or objects aggregated in groups such as in bags, arriving on any of several different conveyances, commonly a conveyor, a truck, a pallet a Gaylord, or a bin etc. Each object must then be distributed to the correct destination location (e.g., a container) as determined by identification information associated with the object, which is commonly determined by a label printed on the object. The destination location may take many forms, such as a bag, a shelf, a container, or a bin.

The processing (e.g., sortation or distribution) of such objects has traditionally been done, at least in part, by human workers that scan the objects, for example with a hand-held barcode scanner, and then place the objects at assigned locations. Many order fulfillment operations, for example, achieve high efficiency by employing a process called wave picking. In wave picking, orders are picked from warehouse shelves and placed at locations (e.g., into bins) containing multiple orders that are sorted downstream. At the sorting stage, individual articles are identified, and multi-article orders are consolidated, for example, into a single bin or shelf location, so that they may be packed and then shipped to customers. The process of sorting these articles has traditionally been done by hand. A human sorter picks an article, and then places the article in the so-determined bin or shelf location where all articles for that order or manifest have been defined to belong. Automated systems for order fulfillment have also been proposed. See, for example, U.S. Patent Application Publication No. 2014/0244026, which discloses the use of a robotic arm together with an arcuate structure that is movable to within reach of the robotic arm.

The identification of objects by code scanning generally either require manual processing, or require that the code location be controlled or constrained so that a fixed or robot-held code scanner (e.g., a barcode scanner) can reliably detect the code. Manually operated barcode scanners are therefore generally either fixed or handheld systems. With fixed systems, such as those at point-of-sale systems, the operator holds the article and places it in front of the scanner, which scans continuously, and decodes any barcodes that it can detect. If the article's code is not immediately detected, the person holding the article typically needs to vary the position or orientation of the article with respect to the fixed scanner, so as to render the barcode more visible to the scanner. For handheld systems, the person operating the scanner may look at the barcode on the article, and then hold the article such that the barcode is within the viewing range of the scanner, and then press a button on the handheld scanner to initiate a scan of the barcode.

Further, many distribution center sorting systems generally assume an inflexible sequence of operation whereby a disorganized stream of input objects is provided (by a human) as a singulated stream of objects that are oriented with respect to a scanner that identifies the objects. An induction element or elements (e.g., a conveyor, a tilt tray, or manually movable bins) transport the objects to desired destination locations or further processing stations, which may be a bin, a chute, a bag or a conveyor etc.

In conventional object sortation or distribution systems, human workers or automated systems typically retrieve object s in an arrival order, and sort each object or object into a collection bin based on a set of given heuristics. For example, all objects of a like type might be directed to a particular collection bin, or all objects in a single customer order, or all objects destined for the same shipping destination, etc. may be directed to a common destination location. Generally, the human workers, with the possible limited assistance of automated systems, are required to receive objects and to move each to their assigned collection bin. If the number of different types of input (received) objects is large, then a large number of collection bins is required.

FIG. 1 for example, shows an object distribution system 10 in which objects arrive, e.g., in trucks, as shown at 12, are separated and stored in packages that each include a specific combination of objects as shown at 14, and the packages are then shipped as shown at 16 to different retail stores, providing that each retail store receives a specific combination of objects in each package. Each package received at a retail store from transport 16, is broken apart at the store and such packages are generally referred to as break-packs. In particular, incoming trucks 12 contain vendor cases 18 of homogenous sets of objects. Each vendor case, for example, may be provided by a manufacturer of each of the objects. The objects from the vendor cases 18 are moved into decanted bins 20, and are then brought to a processing area 14 that includes break-pack store packages 22. At the processing area 14, the break-pack store packages 22 are filled by human workers that select items from the decanted vendor bins to fill the break-pack store packages according to a manifest. For example, a first set of the break-pack store packages may go to a first store (as shown at 24), and a second set of break-pack store packages may go to a second store (as shown at 26). In this way, the system may accept large volumes of product from a manufacturer, and then re-package the objects into break-packs to be provided to retail stores at which a wide variety of objects are to be provided in a specific controlled distribution fashion.

Such a system however, has inherent inefficiencies as well as inflexibilities since the desired goal is to match incoming objects to assigned collection bins. Such systems may require a large number of collection bins (and therefore a large amount of physical space, large investment costs, and large operating costs), in part, because sorting all objects to all destinations at once is not always most efficient. Additionally, such break-pack systems must also monitor the volume of each like object in a bin, requiring that a human worker continuously count the items in a bin.

Further, current state-of-the-art sortation systems also rely in human labor to some extent. Most solutions rely on a worker that is performing sortation, by scanning each object from an induction area (chute, table, etc.) and placing each object at a staging location, conveyor, or collection bin. When a bin is full, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Unfortunately, these systems do not address the limitations of the total number of system bins. The system is simply diverting an equal share of the total objects to each parallel manual cell. Thus, each parallel sortation cell must have all the same collection bin designations; otherwise, an object may be delivered to a cell that does not have a bin to which the object is mapped. There remains a need, therefore, for a more efficient and more cost effective object processing system that processes objects of a variety of sizes and weights into appropriate collection bins or trays of fixed sizes, yet is efficient in handling objects of varying sizes and weights.

SUMMARY

In accordance with an embodiment, the invention provides a processing system for processing objects using a programmable motion device. The processing system includes a plurality of supply bins providing supply of a plurality of objects, with the plurality of supply bins being provided with a bin conveyance system, a programmable motion device in communication with the bin conveyance system, where the programmable motion device includes an end effector for grasping and moving a selected object out of a selected supply bin, and a movable carriage for receiving the selected object from the end effector of the programmable motion device, and for carrying the selected object to one of a plurality of destination containers.

In accordance with another embodiment, the invention provides a processing system for processing objects using a programmable motion device, where the processing system includes a programmable motion device including an end effector for grasping and moving a selected object from a plurality of objects, a movable carriage for receiving the selected object from the end effector of the programmable motion device, and for carrying the selected object to one of a plurality of destination containers, and a destination container displacement system for urging a selected destination container onto an output conveyor.

In accordance with a further embodiment, the invention provides a method of processing of objects. The method includes the steps of providing a plurality of supply bins including a plurality of objects, with the plurality of supply bins being provided with a bin conveyance system, grasping and moving a selected object out of a selected supply bin using a programmable motion device, providing the selected object to a reciprocating carriage, and carrying the selected object to one of a plurality of destination containers using the reciprocating carriage.

BRIEF DESCRIPTION OF THE DRAWINGS

The following description may be further understood with reference to the accompanying drawings in which:

FIGS. 7A and 7B show an illustrative diagrammatic view of a grasp selection process in an object processing system of an embodiment of the present invention;

FIGS. 8A and 8B show an illustrative diagrammatic view of a grasp planning process in an object processing system of an embodiment of the present invention;

FIGS. 9A and 9B show an illustrative diagrammatic view of a grasp execution process in an object processing system of an embodiment of the present invention;

FIG. 10 shows an illustrative diagrammatic top view of an object processing system in accordance with another embodiment of the invention that identifies changing and unchanging motion planning general areas;

The drawings are shown for illustrative purposes only.

DETAILED DESCRIPTION

In accordance with an embodiment, the invention provides a processing system for processing objects using a programmable motion device. The processing system includes a plurality of supply bins, a programmable motion device, and a movable carriage. The plurality of supply bins provide supply of a plurality of objects, and the plurality of supply bins are provided with a bin conveyance system. The programmable motion device is in communication with the bin conveyance system, and the programmable motion device includes an end effector for grasping and moving a selected object out of a selected supply bin. The movable carriage is for receiving the selected object from the end effector of the programmable motion device, and is used for carrying the selected object to one of a plurality of destination containers.

Figure 1:
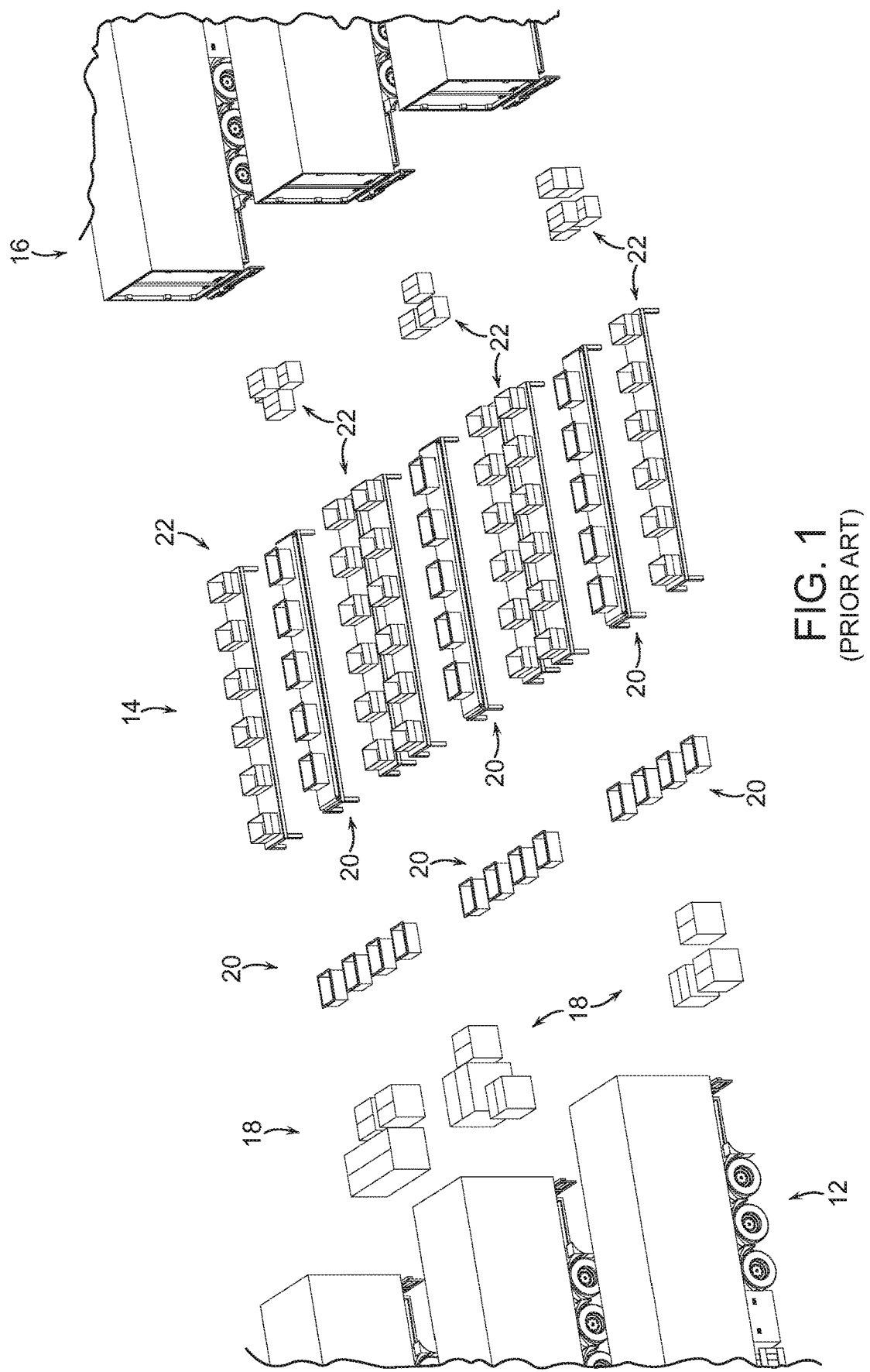
FIG. 1 shows an illustrative diagrammatic view of an object processing system of the prior art.
Figure 2:
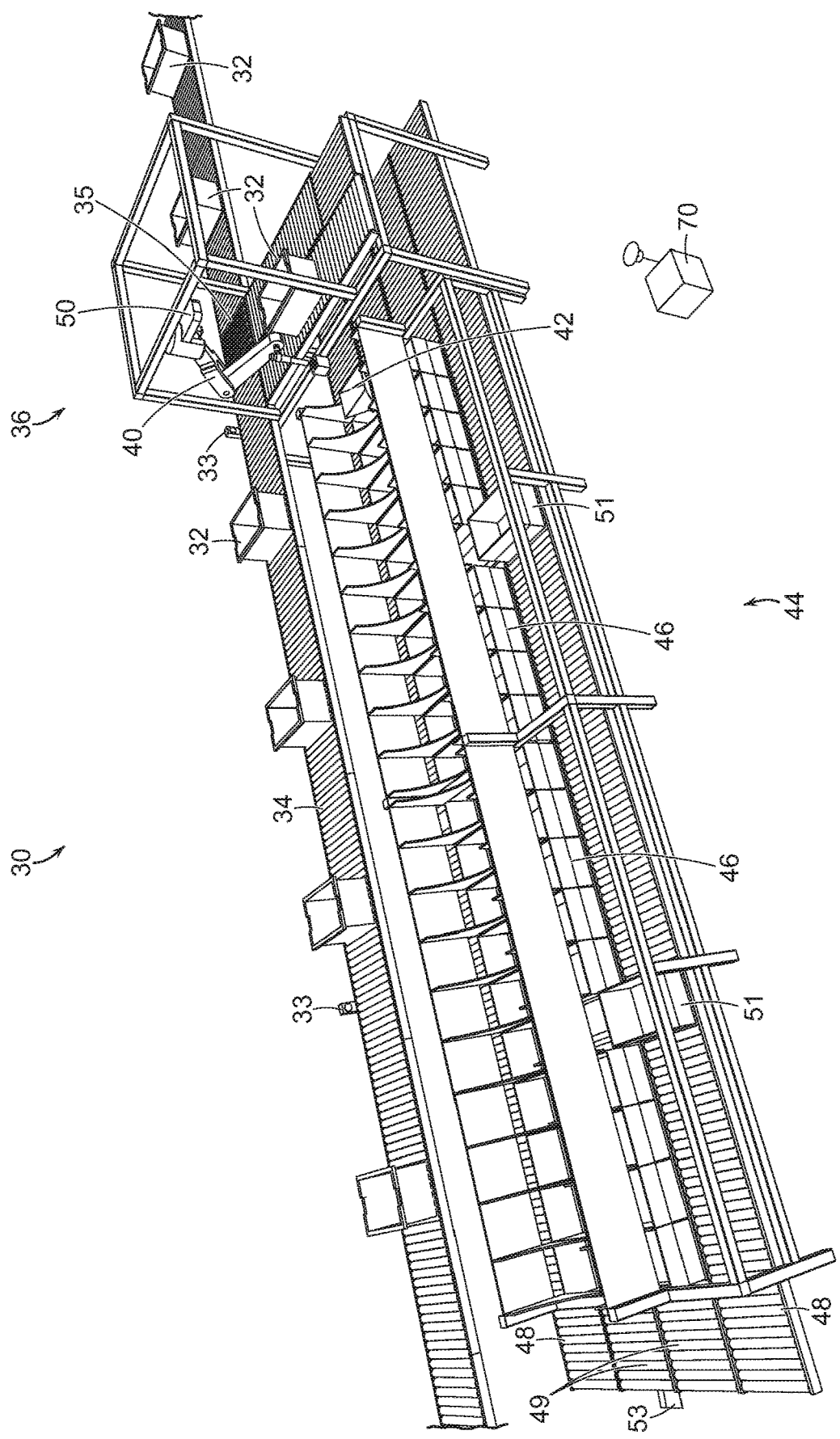
FIG. 2 shows an illustrative diagrammatic view of an object processing system in accordance with an embodiment of the present invention.

With reference to FIG. 2, a system 30 in accordance with an embodiment of the present invention includes an input conveyor 34 on which supply bins 32 (e.g., decanted vendor bins) are provided, a processing section 36 that includes a programmable motion device 40, and a destination section 44 that includes one or more shuttle carriers 42. Generally, supply bins 32 are selectively provided to and from the processing section 36 by a diverter conveyor 35 that moves bins of objects to the processing section 36. The programmable motion device 40 then moves objects from a selected supply bin 32 and places or drops them into a carriage 42 of the destination section 44 for delivery to one of a plurality of destination containers 46. When a destination bin is complete, the completed bin 51 is urged onto an output conveyor 48 for further processing or transport. The conveyor 34 may be motion controlled so that both the speed and the direction of the conveyor (e.g., rollers or belt) may be controlled. In certain embodiments, the conveyors 48 may be gravity biased to cause any destination container 46 on a conveyor 48 to be delivered to an output end without active control of the conveyors 48. Sensors 33 may track each of the supply bins 32 as they travel along the conveyor 34, and the system may thereby know where each supply bin 32 is located at all times.

Figure 15:
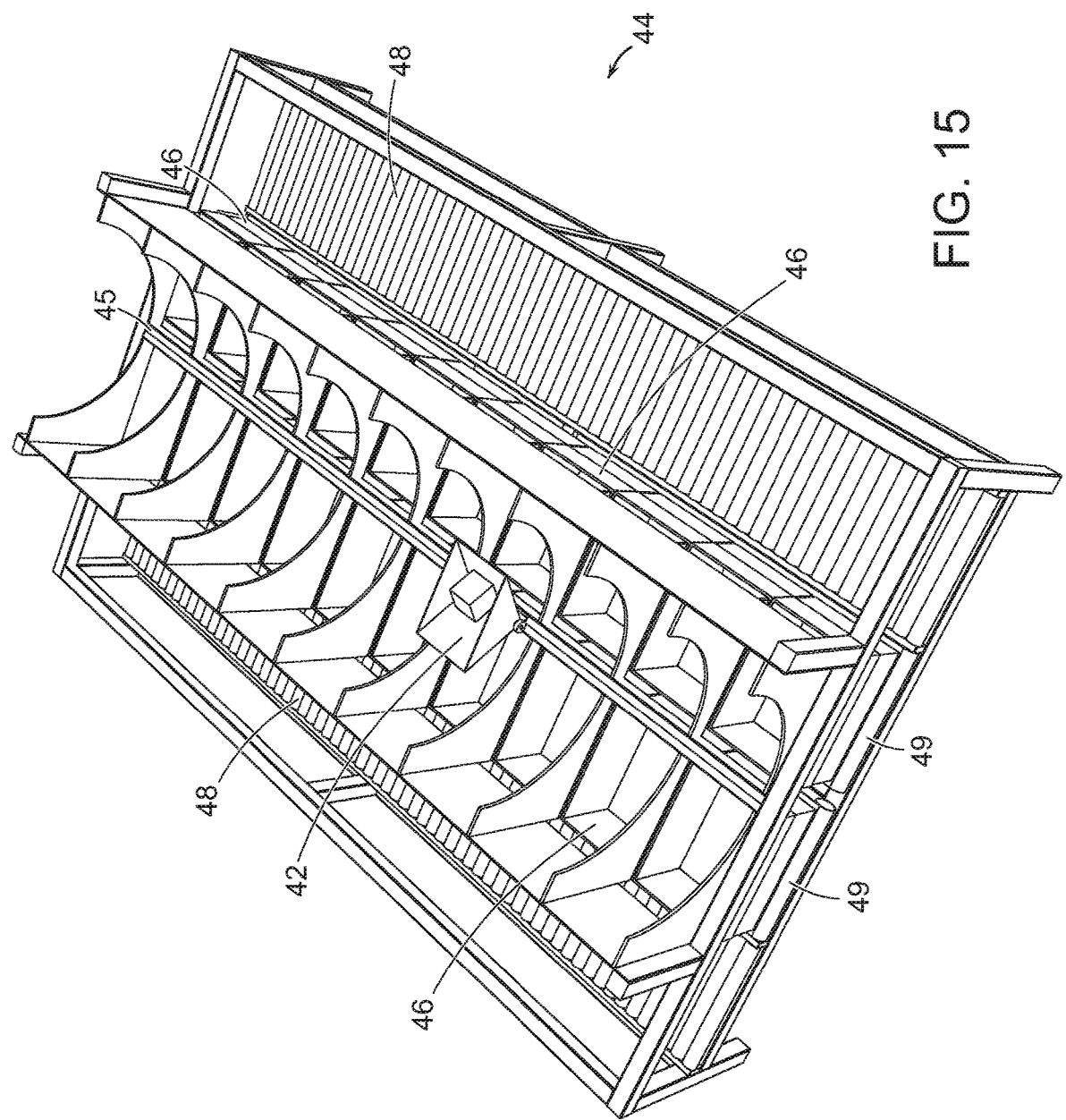
FIG. 15 shows an illustrative diagrammatic view of the processing section of FIG. 14 with the carriage having been moved along its track.

The inner conveyors 49 (also shown in FIG. 15) on which the destination containers 46 ride, may also be gravity biased sloping downward in the opposite direction (with the lower end biased toward the processing section 36). In further embodiments, one or both sets of conveyors 48, 49 may be biased in either direction. The biasing of the destination containers 46 ensures that the destination containers 46 remain next to each other, and when a container 51 is removed, the remaining containers 46 are brought together. Sensors 53, for example, may track each of the containers 46 as they are loaded onto the conveyors 49, and the processing system 70 may thereby know where each container 46 is located. The biasing of the conveyors 48 ensures that completed bins 51 are removed from the destination section 44.

Figure 3:
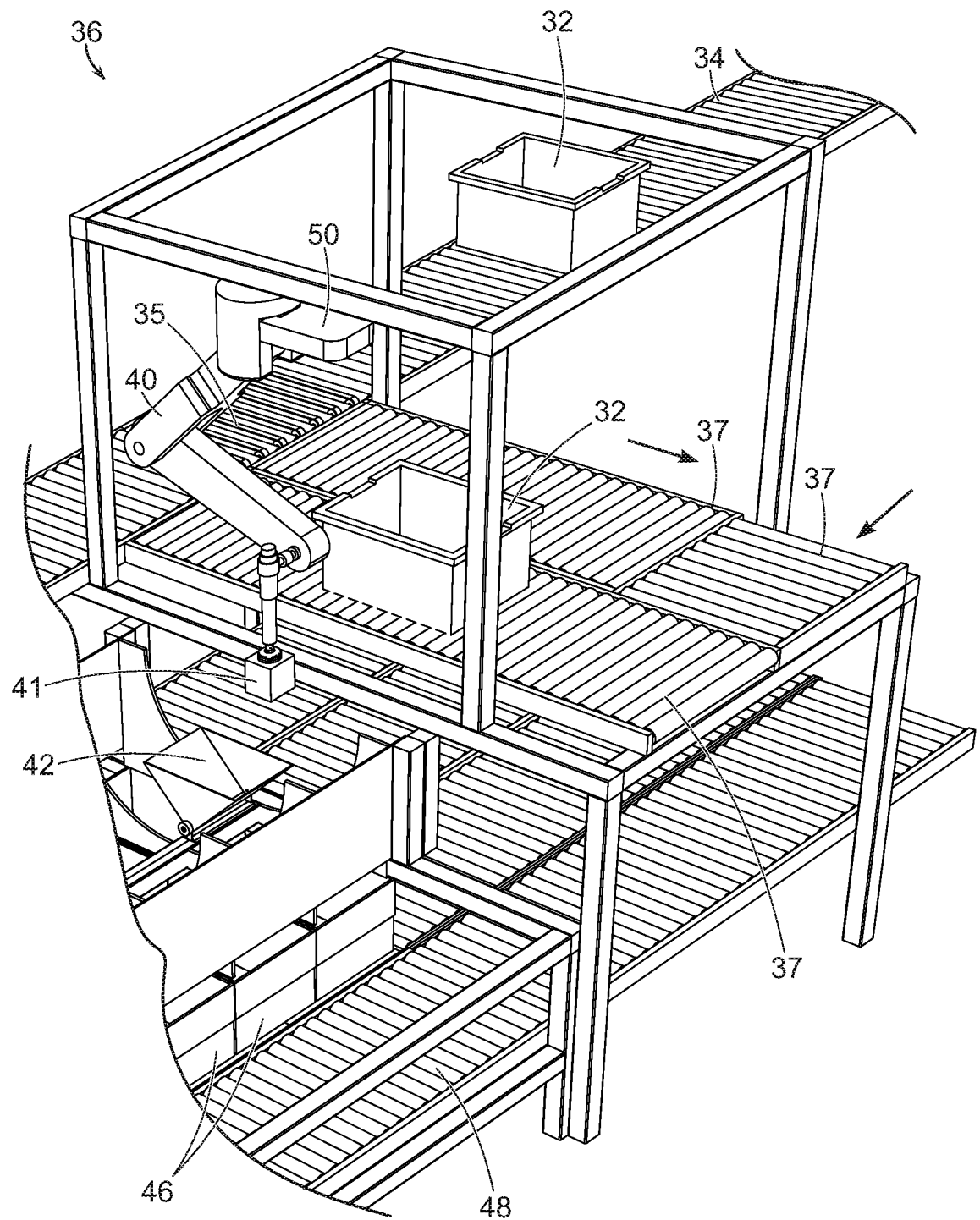
FIG. 3 shows an illustrative diagrammatic view of a processing section of the object processing system of FIG. 2.

With reference to FIG. 3, the processing section 36 also includes a perception unit 50 that looks down onto a conveyor that receives a selected supply bin 32. The processing station may include a conveyor system 37 that circulates supply bins 32 from and back to the input conveyor 34 using the diverter conveyor 35. An end effector 41 of the programmable motion device 40 is programmed to grasp an object from the a supply bin 32, and move the object to deliver it to a desired destination bin 46 by placing or dropping the object into the carriage 42 that then shuttles the object to (and drops the object into) the selected destination container 46. The supply bin 32 may then be returned to the input conveyor 34, and, optionally, brought to a further processing station. At the processing station 36 therefore, one or more vendor supply bins 32 are routed to an input area, and the programmable motion device 40 is actuated to grasp an object from a bin 32, and to place the object into a carriage 42. The processed vendor bins are then returned to the common input stream, and the carriage 42 that received the object is moved away from the processing station 36 toward one of a plurality of destination bins 46.

The system 30 may also include one or more perception units 33 located on or near the input conveyor 34 for identifying indicia on an exterior of each of the bins 32, providing perception data from which the contents of the bin may be identified, and then knowing its relative position on the conveyor 34, track its location. It is assumed that the bins of objects are marked in one or more places on their exterior with a visually distinctive mark such as a barcode (e.g., providing a UPC code) or radio-frequency identification (RFID) tag or mailing label so that they may be sufficiently identified with a scanner for processing. The type of marking depends on the type of scanning system used, but may include 1D or 2D code symbologies. Multiple symbologies or labeling approaches may be employed. The types of scanners employed are assumed to be compatible with the marking approach. The marking, e.g. by barcode, RFID tag, mailing label or other means, encodes a identifying indicia (e.g., a symbol string), which is typically a string of letters and/or numbers. The symbol string uniquely associates the vendor bin with a specific set of homogenous objects.

The operations of the system described above are coordinated with a central processing system 70 as shown in FIG. 2 that communicates (e.g., wirelessly) with the articulated arm 40, the perception units 33, 50 and 53, as well as in-feed conveyor 34. This system determines from symbol strings the UPC associated with a vendor bin, as well as the outbound destination for each object. The central control system 70 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

In accordance with another embodiment of the invention, a system a 30' may include input conveyor 34 on which supply bins 32 (e.g., decanted vendor bins) are provided, a processing section 36' that includes a programmable motion device 40, and a destination section 44 that includes one or more shuttle carriers 42. The programmable motion device 40 is able to service two carriages 42 and two sets of destination bins 46. Again, supply bins 32 are selectively provided to and from the processing section 36' by a diverter conveyor 35 that moves bins of objects to the processing section 36. The programmable motion device 40 then moves objects from a selected supply bin 32 and places or drops them into one of the two carriage 42 of the destination section for delivery to one of a plurality of destination containers 46. When a destination bin is complete, the completed bin 51 is urged onto an output conveyor 48 for further processing or transport. The conveyor 34 may be motion controlled so that both the speed and the direction of the conveyor (e.g., rollers or belt) may be controlled. In certain embodiments, the conveyors 48 may be gravity biased to cause any destination container 46 on a conveyor 48 to be delivered to an output end without active control of the conveyors 48. The sensors 33 may track each of the supply bins 32 as they are passed on the conveyor 34, and the system may thereby know where each supply bin 32 is located at all times.

Again, the inner conveyors 49 on which the destination containers 46 ride, may also be gravity biased sloping downward in the opposite direction (with the lower end biased toward the processing section 36). In further embodiments, one or both sets of conveyors 48, 49 may be biased in either direction. The biasing of the completed conveyors 51 ensures that the destination containers 46 remain next to each other, and when a container 49 is removed, the remaining containers 46 are brought together. The sensors 53, for example, may track each of the containers 46 as they are loaded onto the conveyors 51, and the processing system 70 may thereby know where each container 46 is located. The biasing of the conveyors 48 ensures that completed bins 51 are removed from the destination section 44.

Figure 4:
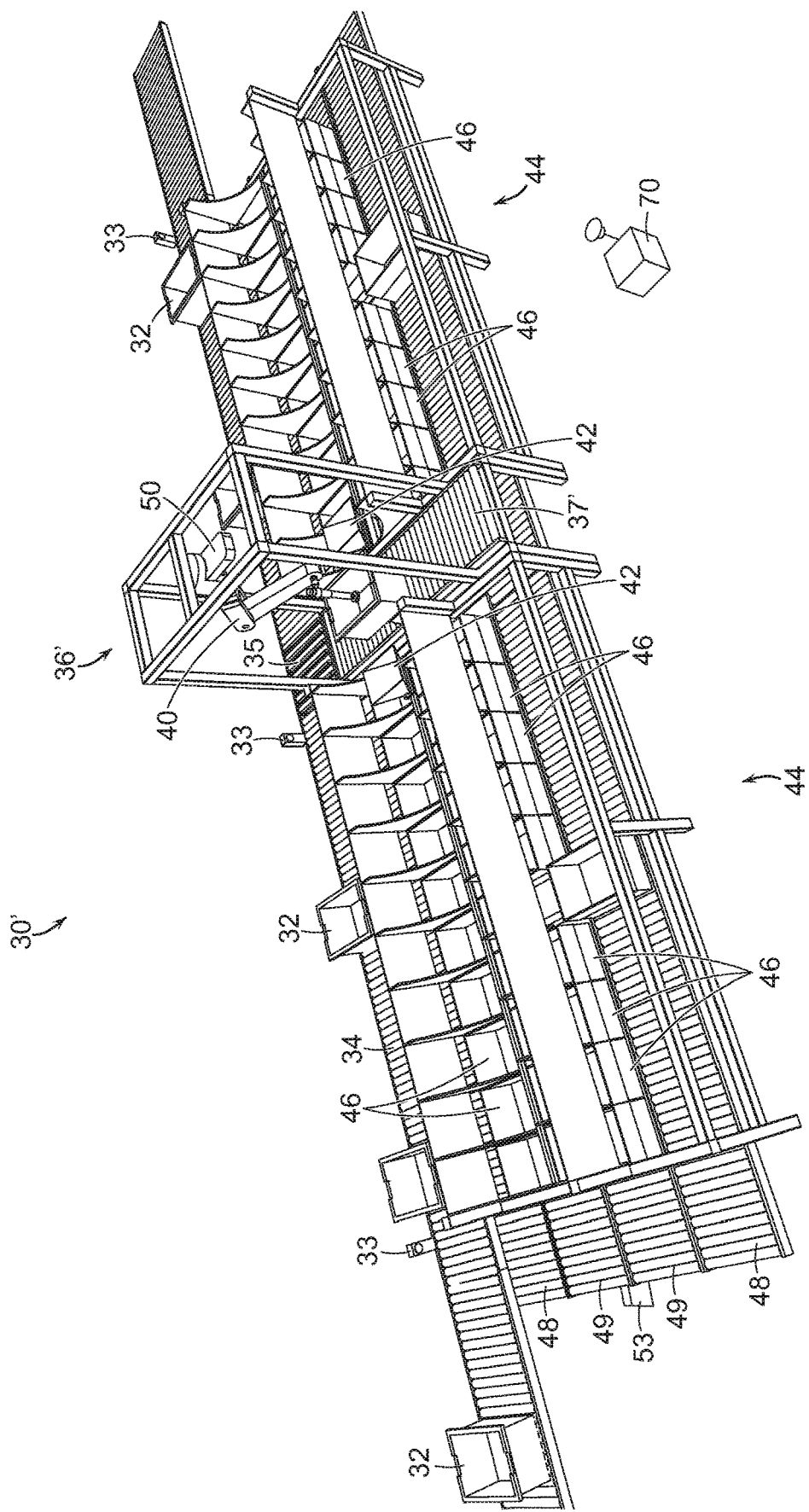
FIG. 4 shows an illustrative diagrammatic view of an object processing system in accordance with another embodiment of the present invention.

With reference to FIG. 4, a system 30' in accordance with another embodiment of the invention may include a processing section 36' that includes a robot 40, which retrieves objects from an input bin 32 on an input area conveyor 37', and provides the objects to one of two carriages 42. As discussed above, each of the carriages runs along a track, bring the object among destination bins 46, and may be actuated to drop the object into a selected destination bin 46. The remaining elements of the system 30' are the same as those of the system 30.

Figure 5:
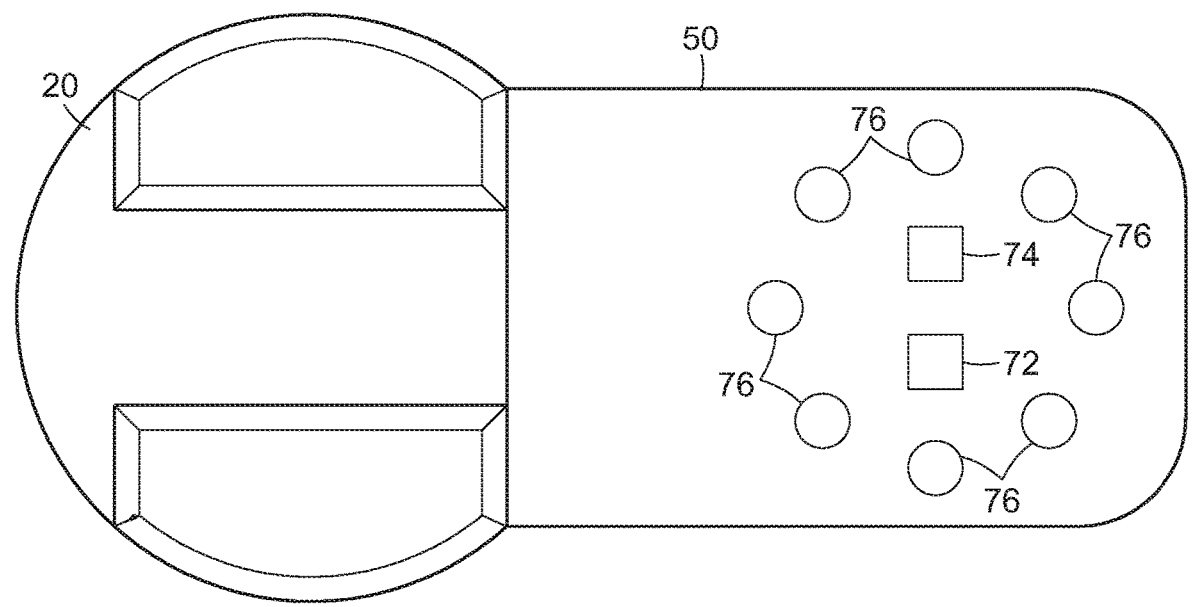
FIG. 5 shows an illustrative diagrammatic view of the perception system of FIGS. 2-4.

The system of various embodiments includes a perception system (e.g., 50) that is mounted above a bin of objects to be processed next to the base of the articulated arm 40, looking down into a bin 32. The perception system 50, for example and as shown in FIG. 5, may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 6:
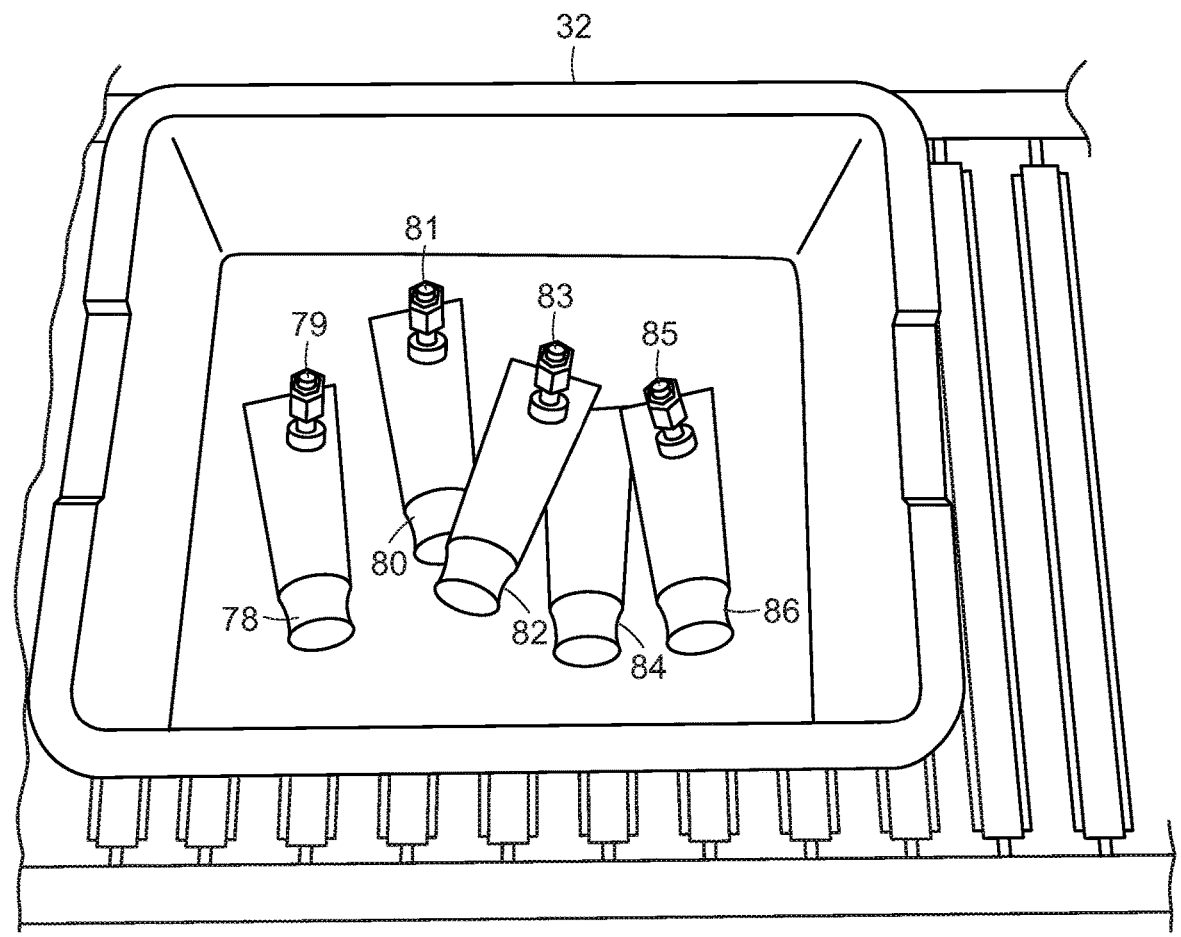
FIG. 6 shows an illustrative diagrammatic view from the perception system of FIGS. 2-4, showing a view of objects within a bin of objects to be processed.

FIG. 6 shows a view of the bin 32 from the perception unit 50. The image view shows the bin 32 (e.g., on the conveyor), and the bin 32 contains objects 78, 80, 82, 84 and 86. In the present embodiment, the objects are homogenous, and are intended for distribution to different distribution packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp location 81 does not because its associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams etc. where a good vacuum seal might not be available.

If an object cannot be fully perceived by the detection system, the perception system considers the object to be two different objects, and may propose more than one candidate grasps of such two different objects. If the system executes a grasp at either of these bad grasp locations, it will either fail to acquire the object due to a bad grasp point where a vacuum seal will not occur, or will acquire the object at a grasp location that is very far from the center of mass of the object and thereby induce a great deal of instability during any attempted transport. Each of these results is undesirable.

If a bad grasp location is experienced, the system may remember that location for the associated object. By identifying good and bad grasp locations, a correlation is established between features in the 2D/3D images and the idea of good or bad grasp locations. Using this data and these correlations as input to machine learning algorithms, the system may eventually learn, for each image presented to it, where to best grasp an object, and where to avoid grasping an object.

As shown in FIGS. 7A and 7B, the perception system may also identify portions of an object that are the most flat in the generation of good grasp location information. In particular, if an object includes a tubular end and a flat end such as object 87, the system would identify the more flat end as shown at 88 in FIG. 7B. Additionally, the system may select the area of an object where a UPC code appears, as such codes are often printed on a relatively flat portion of the object to facilitate scanning of the barcode.

FIGS. 8A and 8B show that for each object 90, 92, the grasp selection system may determine a direction that is normal to the selected flat portion of the object 90, 92. As shown in FIGS. 9A and 9B, the system will then direct the end effector 94 to approach each object 90, 92 from the direction that is normal to the surface in order to better facilitate the generation of a good grasp on each object. By approaching each object from a direction that is substantially normal to a surface of the object, the robotic system significantly improves the likelihood of obtaining a good grasp of the object, particularly when a vacuum end effector is employed.

The invention provides therefore in certain embodiments that grasp optimization may be based on determination of surface normal, i.e., moving the end effector to be normal to the perceived surface of the object (as opposed to vertical picks), and that such grasp points may be chosen using fiducial features as grasp points, such as picking on a barcode, given that barcodes are almost always applied to a flat spot on the object.

In accordance with various embodiments therefore, the invention further provides a processing system that may learn object grasp locations from experience (and optionally human guidance). Systems designed to work in the same environments as human workers will face an enormous variety of objects, poses, etc. This enormous variety almost ensures that the robotic system will encounter some configuration of object(s) that it cannot handle optimally; at such times, it is desirable to enable a human operator to assist the system and have the system learn from non-optimal grasps.

The system optimizes grasp points based on a wide range of features, either extracted offline or online, tailored to the gripper's characteristics. The properties of the suction cup influence its adaptability to the underlying surface, hence an optimal grasp is more likely to be achieved when picking on the estimated surface normal of an object rather than performing vertical gantry picks common to current industrial applications.

In addition to geometric information the system uses appearance based features as depth sensors may not always be accurate enough to provide sufficient information about graspability. For example, the system can learn the location of fiducials such as barcodes on the object, which can be used as indicator for a surface patch that is flat and impermeable, hence suitable for a suction cup. One such example is the use of barcodes on consumer products. Another example is shipping boxes and bags, which tend to have the shipping label at the object's center of mass and provide an impermeable surface, as opposed to the raw bag material, which might be slightly porous and hence not present a good grasp.

By identifying bad or good grasp points on the image, a correlation is established between features in the 2D/3D imagery and the idea of good or bad grasp points; using this data and these correlations as input to machine learning algorithms, the system can eventually learn, for each image presented to it, where to grasp and where to avoid.

This information is added to experience based data the system collects with every pick attempt, successful or not. Over time the robot learns to avoid features that result in unsuccessful grasps, either specific to an object type or to a surface/material type. For example, the robot may prefer to avoid picks on shrink wrap, no matter which object it is applied to, but may only prefer to place the grasp near fiducials on certain object types such as shipping bags.

This learning can be accelerated by off-line generation of human-corrected images. For instance, a human could be presented with thousands of images from previous system operation and manually annotate good and bad grasp points on each one. This would generate a large amount of data that could also be input into the machine learning algorithms to enhance the speed and efficacy of the system learning.

In addition to experience based or human expert based training data, a large set of labeled training data can be generated based on a detailed object model in physics simulation making use of known gripper and object characteristics. This allows fast and dense generation of graspability data over a large set of objects, as this process is not limited by the speed of the physical robotic system or human input.

The system of an embodiment may also employ motion planning using a trajectory database that is dynamically updated over time, and is indexed by customer metrics. The problem domains contain a mix of changing and unchanging components in the environment. For example, the objects that are presented to the system are often presented in random configurations, but the target locations into which the objects are to be placed are often fixed and do not change over the entire operation.

One use of the trajectory database is to exploit the unchanging parts of the environment by pre-computing and saving into a database trajectories that efficiently and robustly move the system through these spaces. Another use of the trajectory database is to constantly improve the performance of the system over the lifetime of its operation. The database communicates with a planning server that is continuously planning trajectories from the various starts to the various goals, to have a large and varied set of trajectories for achieving any particular task. In various embodiments, a trajectory path may include any number of changing and unchanging portions that, when combined, provide an optimal trajectory path in an efficient amount of time.

FIG. 10 for example, shows a diagrammatic view of a system in accordance with an embodiment of the invention that includes an input area conveyor 37 that provide input bins 32 to a programmable motion device (as shown diagrammatically at 40), such as an articulated arm, having a base as shown at 110, and an end effector (shown diagrammatically at 41) that is programmed to have a home position (shown at 112), and is programmed for moving objects from an input bin 32 to processing locations, e.g., destination locations at the plurality of destination locations 46. Again, the system may include a defined home or base location 110 to which each object may initially be brought upon acquisition from the bin 32.

In certain embodiments, the system may include a plurality of base locations, as well as a plurality of predetermined path portions associated with the plurality of base locations. The trajectories taken by the articulated arm of the robot system from the input bin to the base location are constantly changing based in part, on the location of each object in the input bin, the orientation of the object in the input bin, and the shape, weight and other physical properties of the object to be acquired.

Once the articulated arm has acquired an object and is positioned at the base location, the paths to each of the plurality of destination carriers 46 are not changing. In particular, each destination bin is associated with a unique destination bin location, and the trajectories from the base location to each of the destination bin locations individually is not changing. A trajectory, for example, may be a specification for the motion of a programmable motion device over time. In accordance with various embodiments, such trajectories may be generated by experience, by a person training the system, and/or by automated algorithms. For a trajectory that is not changing, the shortest distance is a direct path to the target destination bin, but the articulated arm is comprised of articulated sections, joints, motors etc. that provide specific ranges of motion, speeds, accelerations and decelerations. Because of this, the robotic system may take any of a variety of trajectories between, for example, base locations and destination bin locations.

Figure 11:
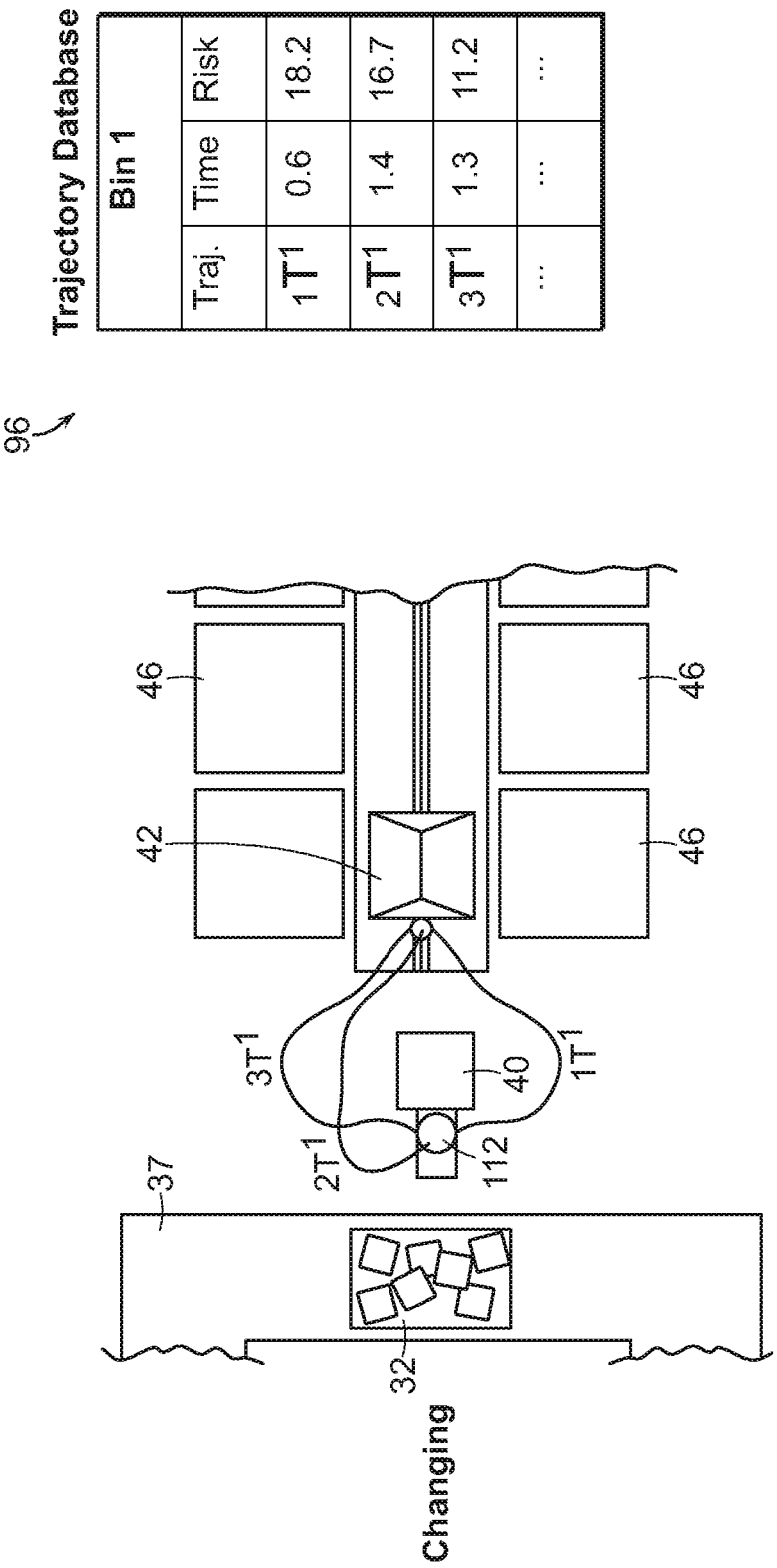
FIG. 11 shows an illustrative diagrammatic top view of the system of FIG. 10, showing multiple possible paths from the programmable motion device to a destination carrier.

FIG. 11 for example, shows three such trajectories ($_1T^1$, $_2T^1$ and $_3T^1$) between base location 112 and a carriage location at 42. The elements of FIG. 11 are the same as those of FIG. 10. Each trajectory will have an associated time as well as an associated risk factor. The time is the time it takes for the articulated arm of the robotic system to accelerate from the base location 112 move toward the carriage bin 42, and decelerate to the carriage bin 42 in order to place the object in the carriage bin 42.

The risk factor may be determined in a number of ways including whether the trajectory includes a high (as pre-defined) acceleration or deceleration (linear or angular) at any point during the trajectory. The risk factor may also include any likelihood that the articulated arm may encounter (crash into) anything in the robotic environment. Further, the risk factor may also be defined based on learned knowledge information from experience of the same type of robotic arms in other robotic systems moving the same object from a base location to the same destination location.

As shown in the table at 96 in FIG. 11, the trajectory $_1T^1$ from the base location 112 to the carriage location 42 may have a fast time (0.6 s) but a high risk factor. The trajectory $_2T^1$ from the base location 112 to the carriage location 42 may have a much slower time (1.4 s) but still a fairly high risk factor (16.7). The trajectory $_3T^1$ from the base location 112 to the carriage location 42 may have a relatively fast time (1.3 s) and a moderate risk factor (11.2). The choice of selecting the fastest trajectory is not always the best as sometimes the fastest trajectory may have an unacceptably high risk factor. If the risk factor is too high, valuable time may be lost by failure of the robotic system to maintain acquisition of the object. Different trajectories therefore, may have different times and risk factors, and this data may be used by the system in motion planning.

Figure 12:
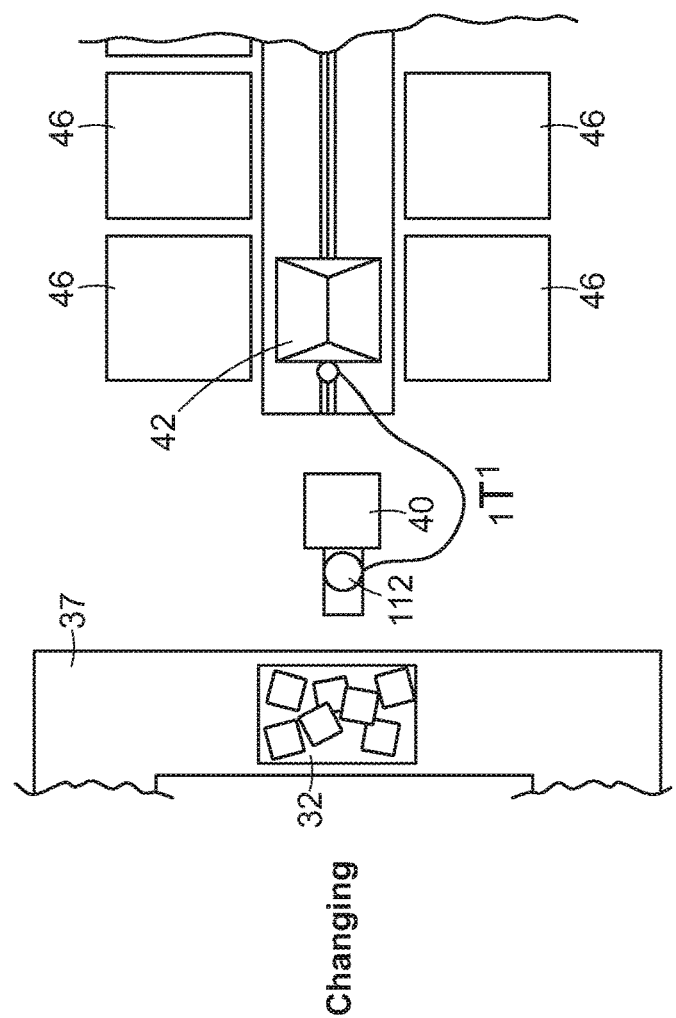
FIG. 12 shows an illustrative diagrammatic top view of the system of FIG. 10, showing a path from the programmable motion device to a destination carrier with an emphasis on minimum time.

FIG. 12, for example, shows minimum time-selected trajectories from the base location 112 to the carriage locations 42. In particular, the tables shown at 97 that the time and risk factors for a plurality of paths, and the trajectories from the base location 112 to the carriage location 42 are chosen to provide the minimum time for motion planning for motion planning under a risk factor of 14.0.

Figure 13:
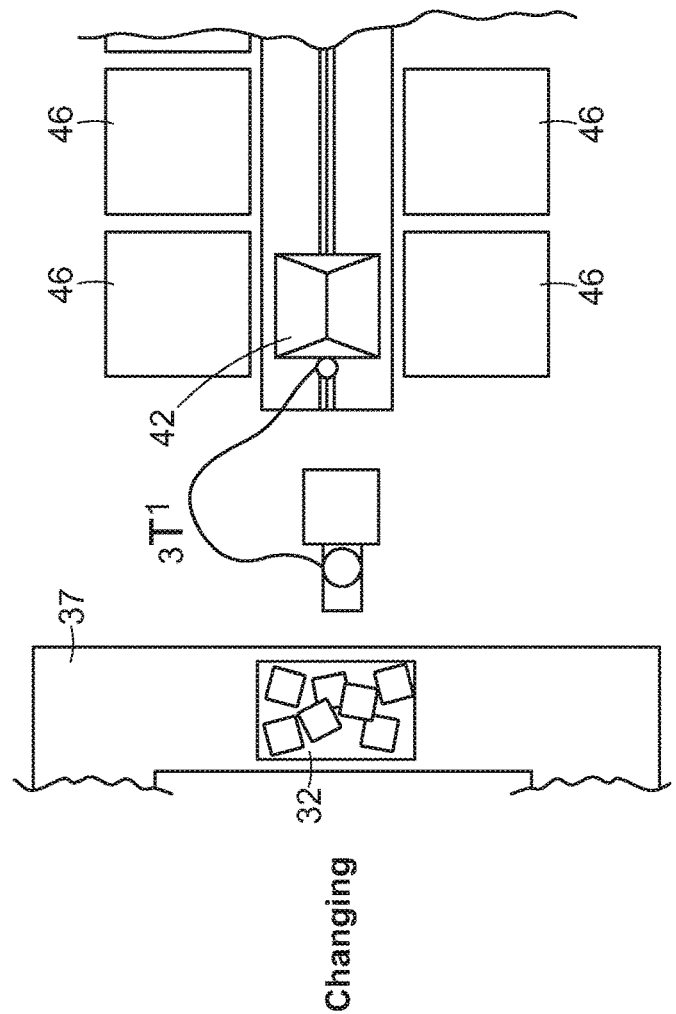
FIG. 13 shows an illustrative diagrammatic top view of the system of FIG. 10, showing a path from the programmable motion device to a destination carrier with an emphasis on minimum risk.

FIG. 13 shows minimum risk-factor-selected set of trajectories from the base location 112 to the carriage location 42. Again, the tables shown at 97 show the time and risk factors for the various paths. The trajectories from the base location 112 to each of the carriage 42 are chosen to provide the minimum risk factor for motion planning for motion planning under a maximum time of 1.2 seconds.

The choice of fast time vs. low risk factor may be determined in a variety of ways, for example, by choosing the fastest time having a risk factor below an upper risk factor limit (e.g., 12 or 14), or by choosing a lowest risk factor having a maximum time below an upper limit (e.g., 1.0 or 1.2). Again, if the risk factor is too high, valuable time may be lost by failure of the robotic system to maintain acquisition of the object. An advantage of the varied set is robustness to small changes in the environment and to different-sized objects the system might be handling: instead of re-planning in these situations, the system iterates through the database until it finds a trajectory that is collision-free, safe and robust for the new situation. The system may therefore generalize across a variety of environments without having to re-plan the motions.

Overall trajectories therefore, may include any number of changing and unchanging sections. For example, networks of unchanging trajectory portions may be employed as commonly used paths (roads), while changing portions may be directed to moving objects to a close-by unchanging portion (close road) to facilitate moving the object without requiring the entire route to be planned. For example, the programmable motion device (e.g., a robot) may be tasked with orienting the grasped object in front of an automatic labeler before moving towards the destination. The trajectory to sort the object therefore, would be made up of the following trajectory portions: First, a grasp pose to a home position (motion planned). Then, from home position to an auto-labeler home (pulled from a trajectory database). Then, from the auto-labeler home to a labelling pose (motion planned). Then, from the labelling pose to an auto-labeler home (either motion planned or just reverse the previous motion plan step). Then, from the auto-labeler home to the intended destination (pulled from the trajectory database). A wide variety of changing and unchanging (planned and pulled from a database) portions may be employed in overall trajectories. In accordance with further embodiments, the object may be grasped from a specific pose (planned), and when the object reaches a destination bin (from the trajectory database), the last step may be to again place the object in the desired pose (planned) within the destination bin.

In accordance with further embodiments, the motion planning may also provide that relatively heavy items (as may be determined by knowing information about the grasped object or by sensing weight—or both—at the end effector) may be processed (e.g., moved in trajectories) and placed in boxes in very different ways than the processing and placement of relatively light objects. Again, the risk verses speed calculations may be employed for optimization of moving known objects of a variety of weights and sizes as may occur, for example, in the processing of a wide variety of consumer products. The system, therefore, provides means that interface with the customer's outgoing object conveyance systems. When a bin (or package) is full as determined by the system (in monitoring system operation), a human operator may pull the bin from the processing area, and place the bin in an appropriate conveyor. When a bin is full and gets removed to the closed/labelled location, another empty bin is immediately placed in the location freed up by the removed full bin, and the system continues processing as discussed above.

Figure 14:
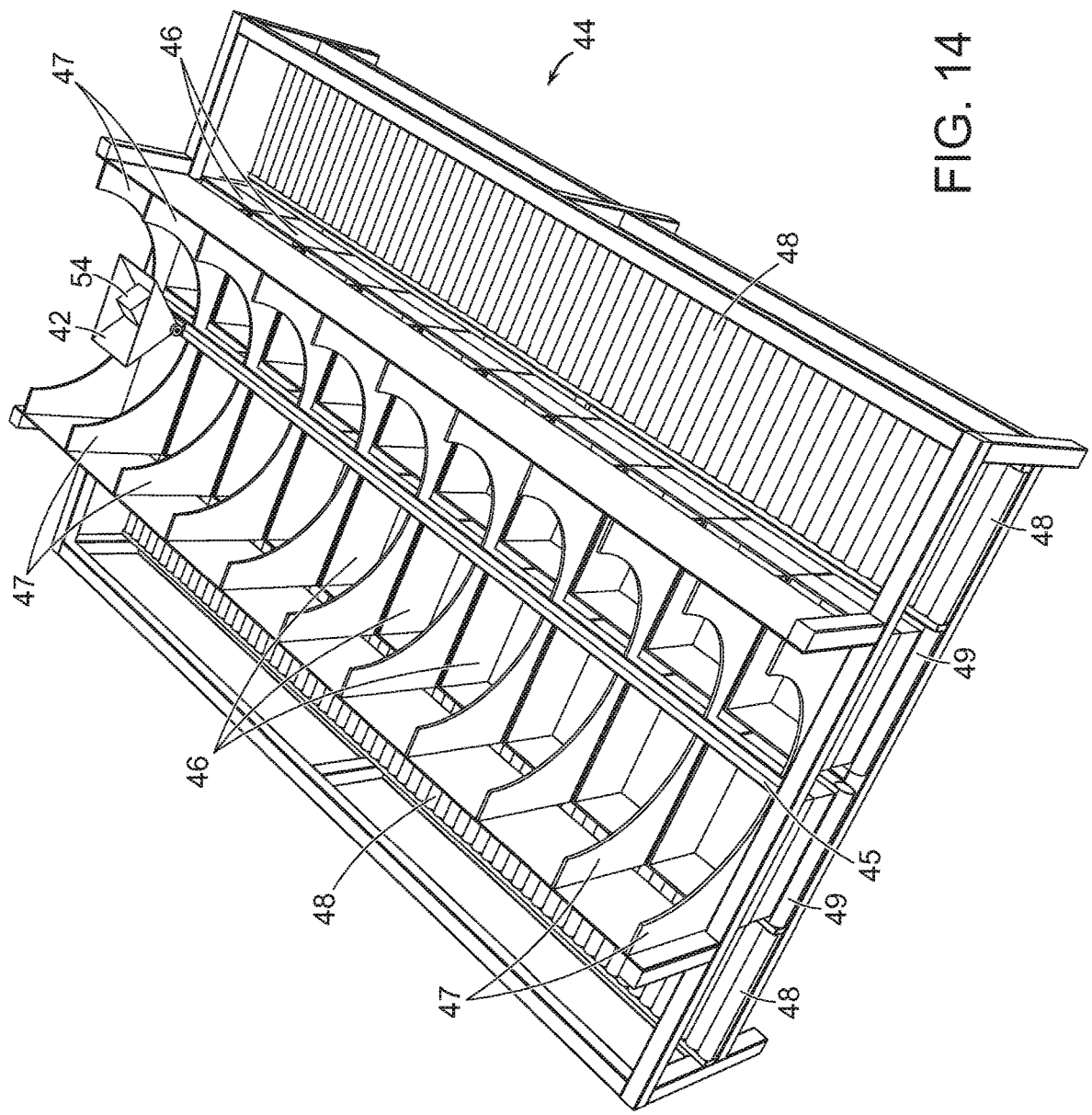
FIG. 14 shows an illustrative diagrammatic view of a processing section in an object processing system in accordance with an embodiment of the invention wherein an object is placed in a carriage.
Figure 16:
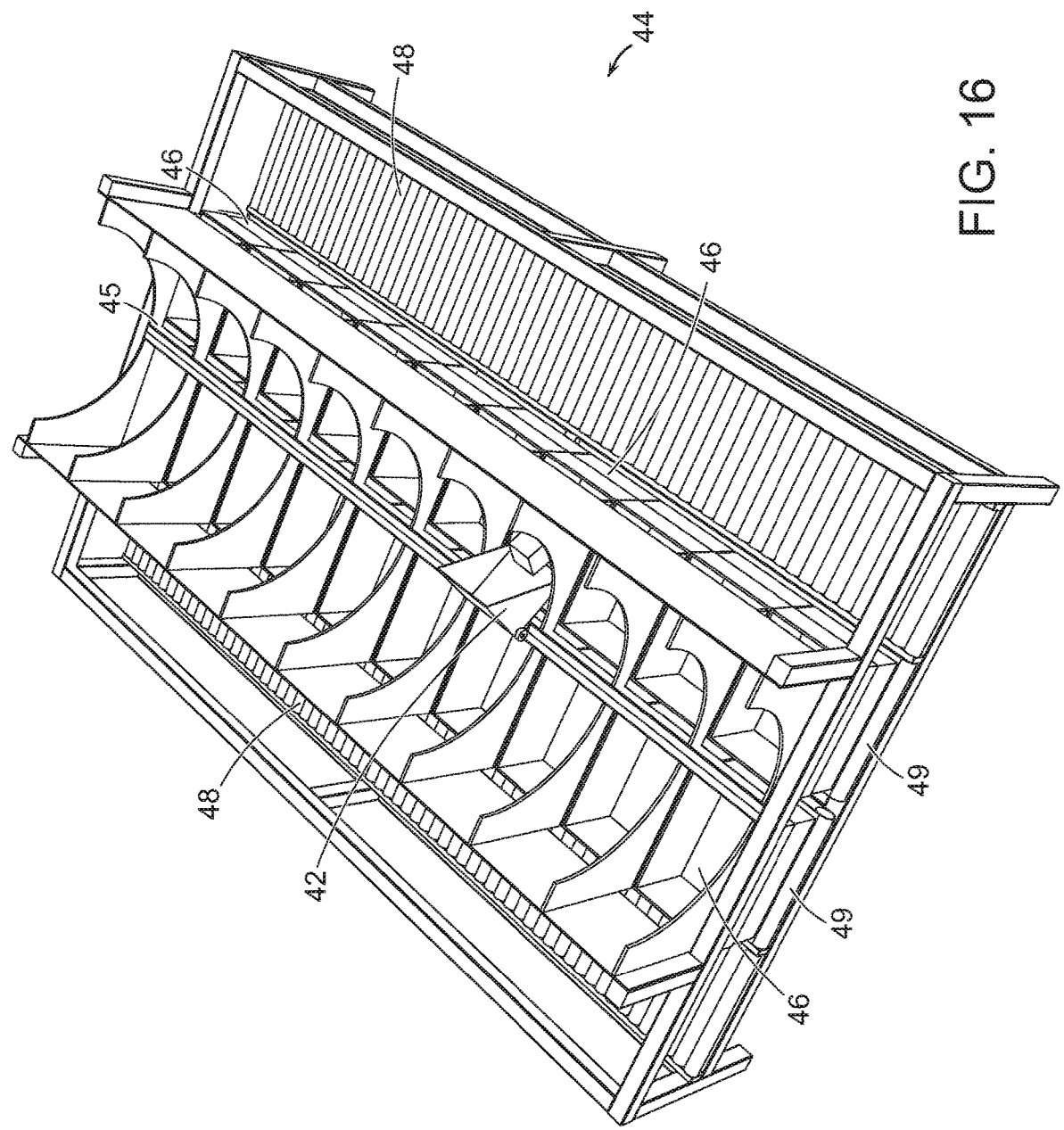
FIG. 16 shows an illustrative diagrammatic view of the processing section of FIG. 14 with the carriage having transferred its load to a destination bin.

FIG. 14 shows the destination section 44 of the system 30 that includes a movable carriage 42 that may receive an object 54 from the end effector of the programmable motion device. The movable carriage 42 is reciprocally movable between two rows of the destination bins 46 along a guide rail 45. As shown in FIG. 14, each destination bin 46 includes a guide chute 47 that guides an object dropped therein into the underlying destination bin 46. The carriage 42 moves along a track 45 (as further shown in FIG. 15), and the carriage may be actuated to drop an object 54 into a desired destination bin 46 via a guide chute 47 (as shown in FIG. 16).

The movable carriage 42 is therefore reciprocally movable between the destination bins, and the/each carriage moves along a track, and may be actuated to drop an object into a desired destination bin 24. The destination bins may be provided in a conveyor (e.g., rollers or belt), and may be biased (for example by gravity) to urge all destination bins toward one end (for example, the distal end. When a destination bin is selected for removal (e.g., because the bin is full or otherwise ready for further processing), the system will urge the completed bin onto an output conveyor to be brought to a further processing or shipment station. The conveyor may be biased (e.g., by gravity) or powered to cause any bin on the conveyor to be brought to an output location.

Figure 17A:
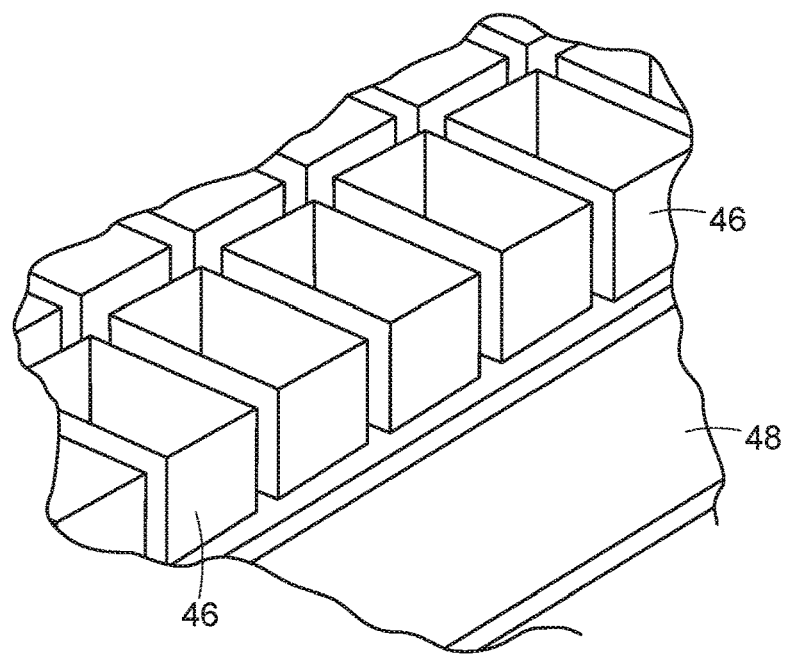
FIGS. 17A and 17B show illustrative diagrammatic views of a bin removal mechanism for use in an object processing system in accordance with an embodiment of the invention.
Figure 17B:
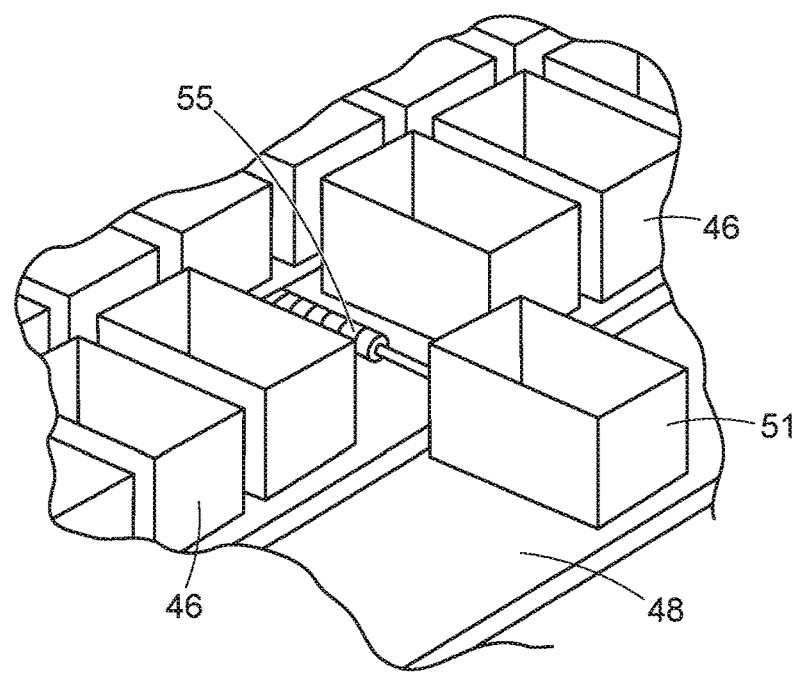

FIGS. 17A and 17B show a bin 51 being urged from the plurality of destination bins 46, onto the output conveyor 48 by the use of a displacement mechanism 55. In accordance with further embodiments, the destination bins may be provided as boxes or containers or any other type of device that may receive and hold an item, including box tray assemblies as discussed below.

Figure 18:
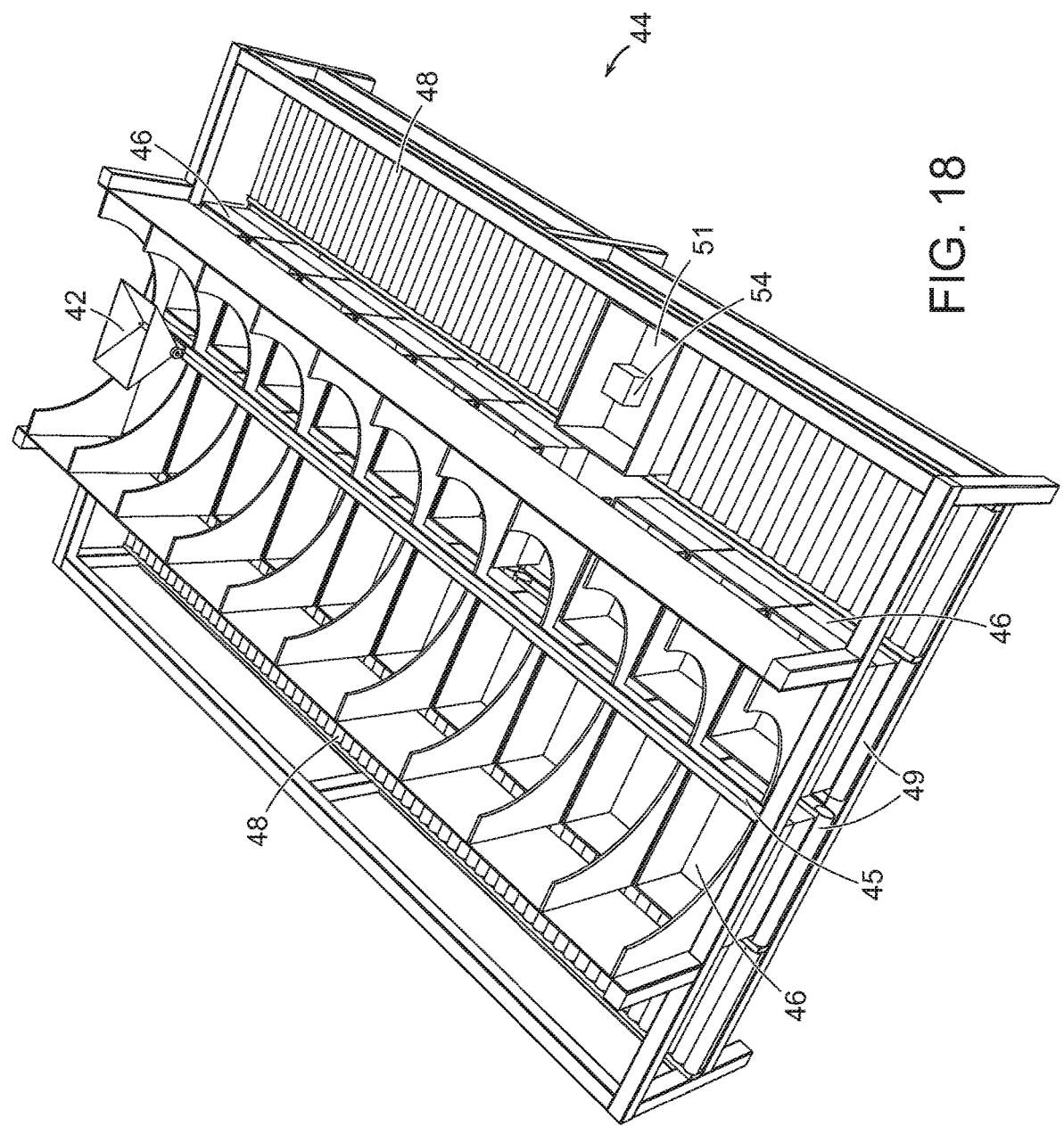
FIG. 18 shows an illustrative diagrammatic view of the processing section of FIG. 14 with the carriage having returned to its base, and a removed destination bin being moved urged from its location.
Figure 19:
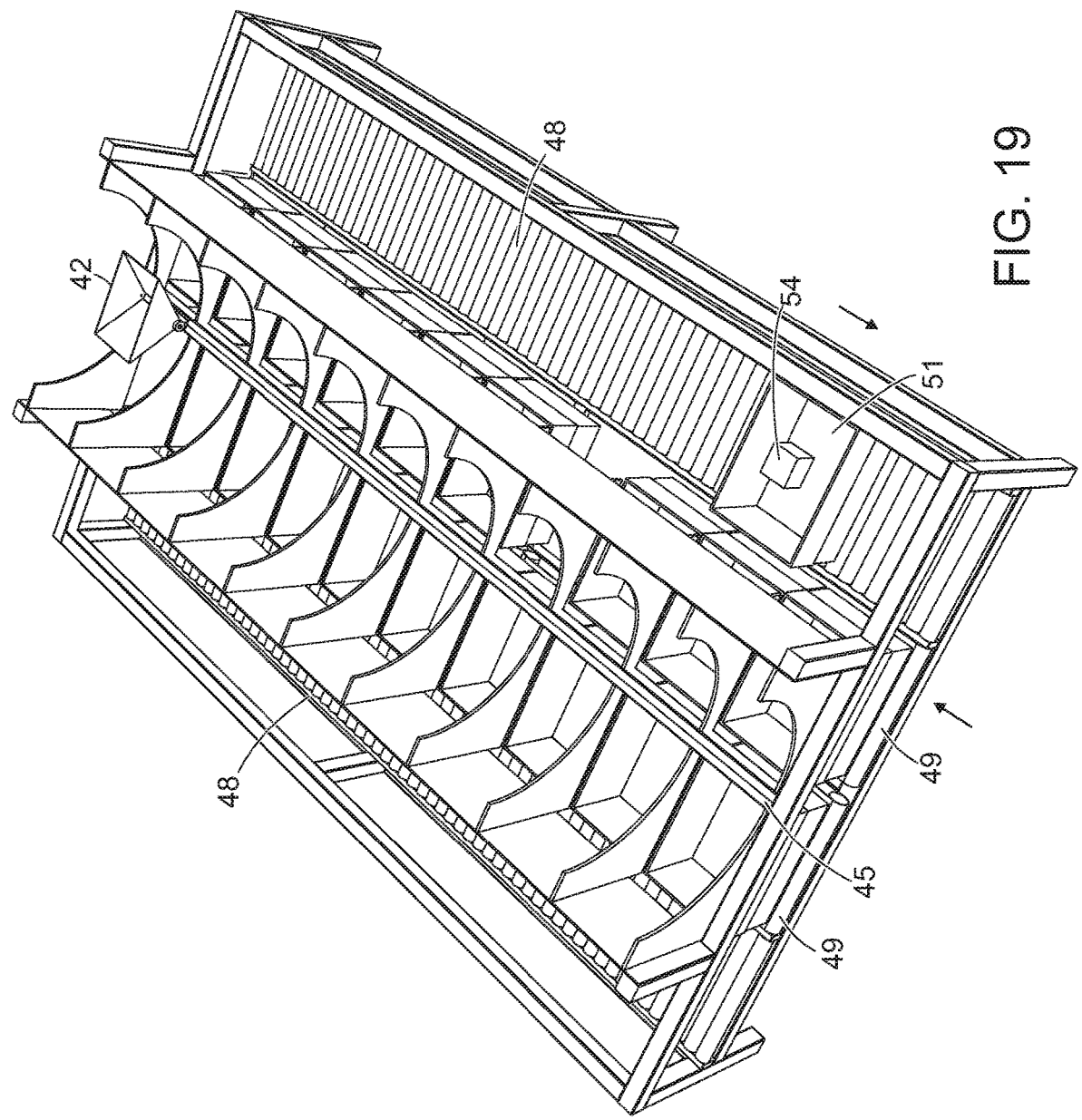
FIG. 19 shows an illustrative diagrammatic view of the processing section of FIG. 14 with the removed destination bin being moved along an output conveyor.

Following displacement of the bin onto the conveyor (as shown in FIG. 18), each of the destination bins may be urged together (as shown in FIG. 19) and the system will record the change in position of any of the bins that moved. This way, a new empty bin may be added to the end, and the system will record the correct location and identified processing particulars of each of the destination bins.

As noted above, the bins 46 may be provided as boxes, totes, containers or any other type of device that may receive and hold an item. In further embodiments, the bins may be provided in uniform trays (to provide consistency of spacing and processing) and may further include open covers that may maintain the bin in an open position, and may further provide consistency in processing through any of spacing, alignment, or labeling.

Figure 20:
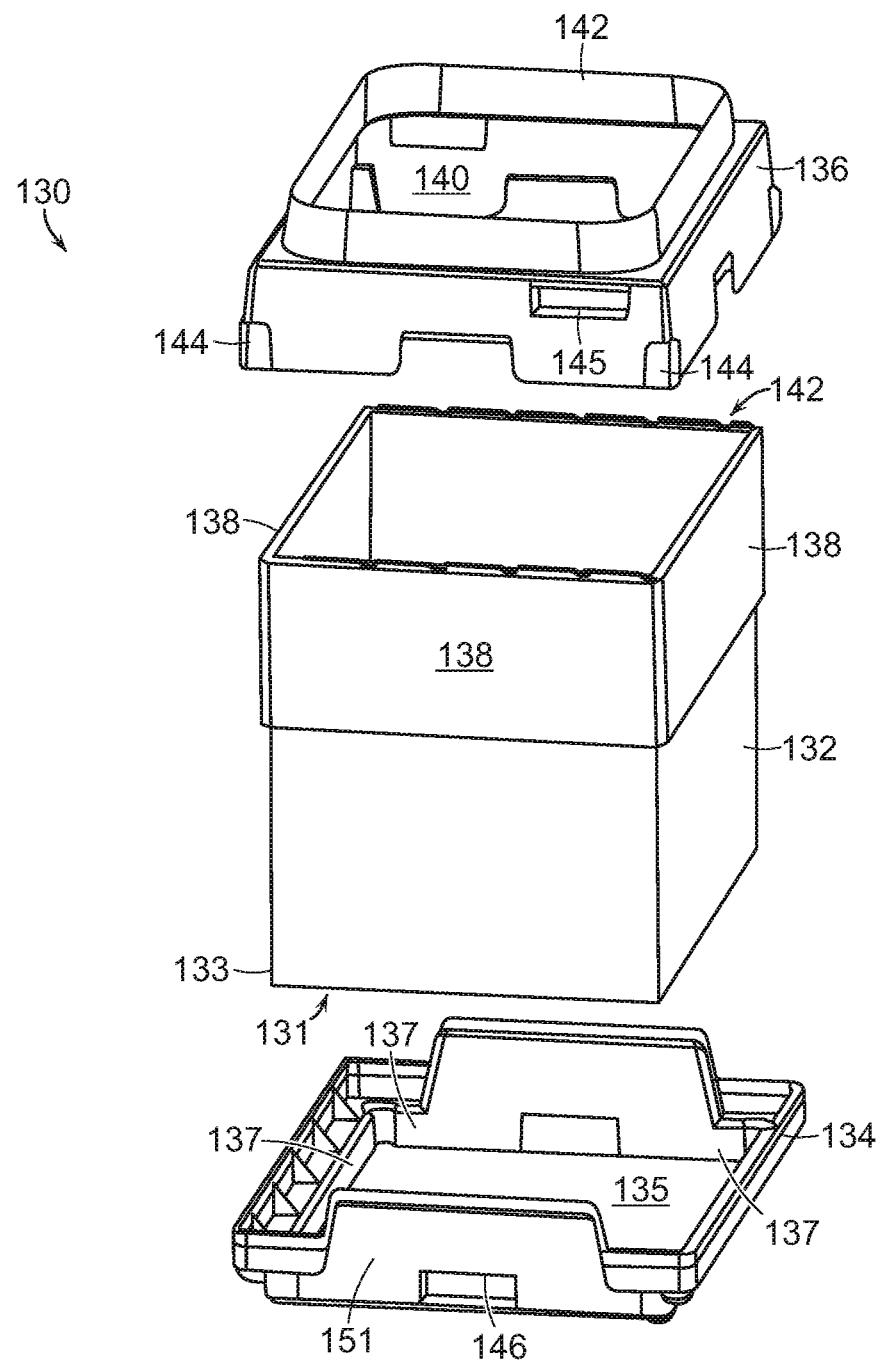
FIG. 20 shows an illustrative diagrammatic exploded view of a box assembly for use as a storage bin or destination bin in accordance with various embodiments of the present invention.

For example, FIG. 20 shows an exploded view of a box tray assembly 130. As shown, the box 132 (e.g., a standard shipping sized cardboard box) may include bottom 131 and side edges 133 that are received by a top surface 135 and inner sides 137 of a box tray 134. The box tray 134 may include a recessed (protected) area in which a label or other identifying indicia 146 may be provided, as well as a wide and smooth contact surface 151 that may be engaged by an urging or removal mechanism as discussed below.

As also shown in FIG. 20, the box 132 may include top flaps 138 that, when opened as shown, are held open by inner surfaces 140 of the box cover 136. The box cover 136 may also include a recessed (protected) area in which a label or other identifying indicia 145 may be provided The box cover 136 also provides a defined rim opening 142, as well as corner elements 144 that may assist in providing structural integrity of the assembly, and may assist in stacking un-used covers on one another. Un-used box trays may also be stacked on each other.

Figure 21:
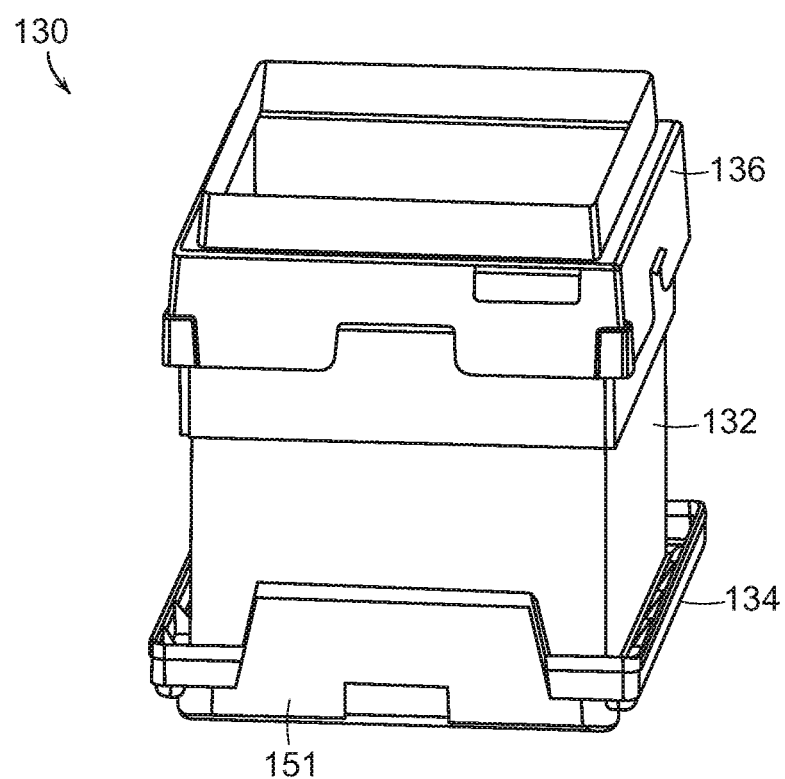
FIG. 21 shows an illustrative diagrammatic view of the assembled box tray assembly of FIG. 20.

The box 132 is thus maintained securely within the box tray 134, and the box cover 136 provides that the flaps 138 remain down along the outside of the box permitting the interior of the box to be accessible through the opening 142 in the box cover 136. FIG. 21 shows a width side view of the box tray assembly 130 with the box 132 securely seated within the box tray 134, and the box cover holding open the flaps 138 of the box 132. The box tray assemblies may be used as any or both of the storage bins and destination bins in various embodiments of the present invention.

Figure 22A:
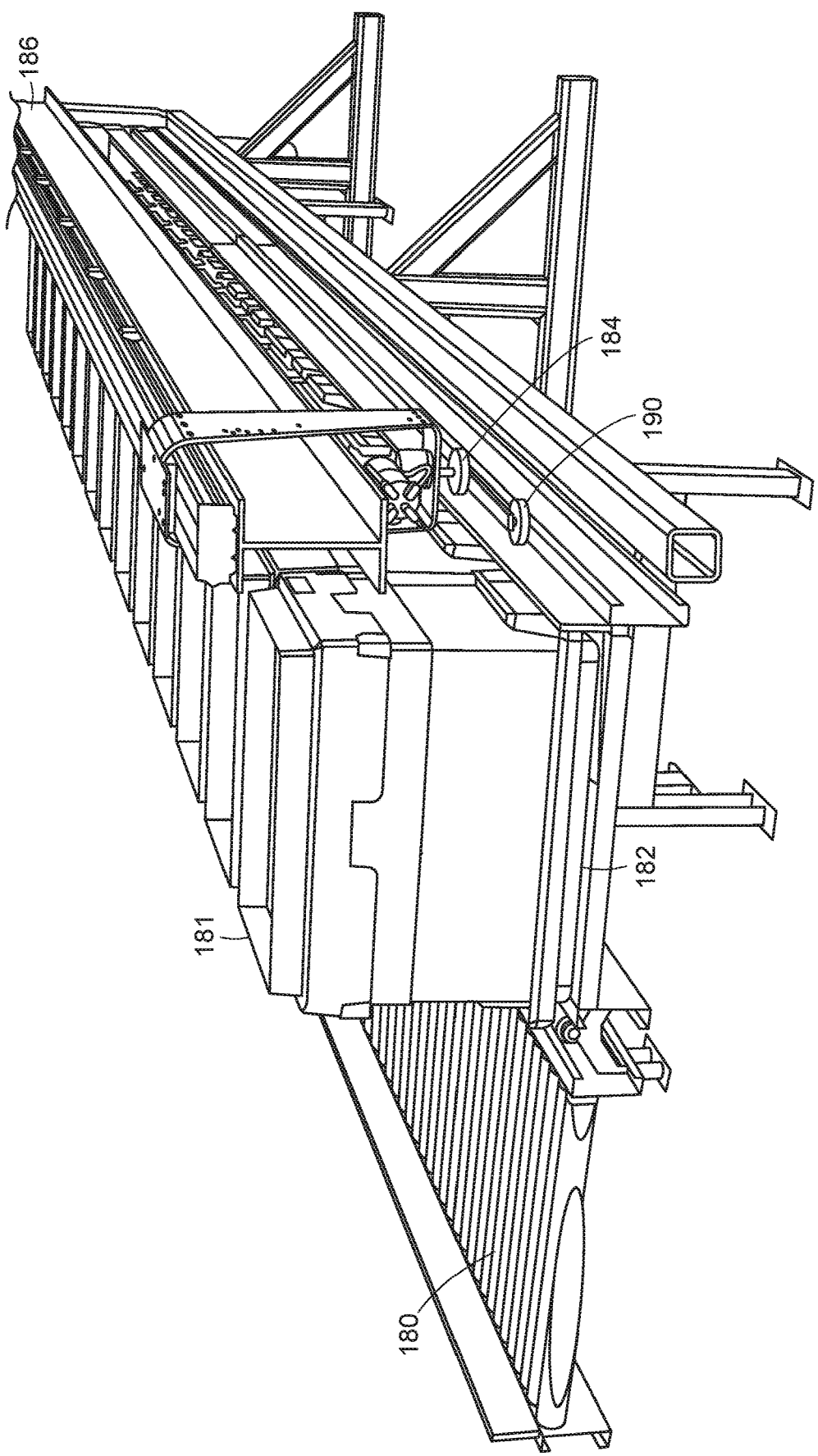
FIGS. 22A-22D show illustrative diagrammatic views of a further embodiment of a bin displacement system for use in further embodiments of the invention.
Figure 22B:
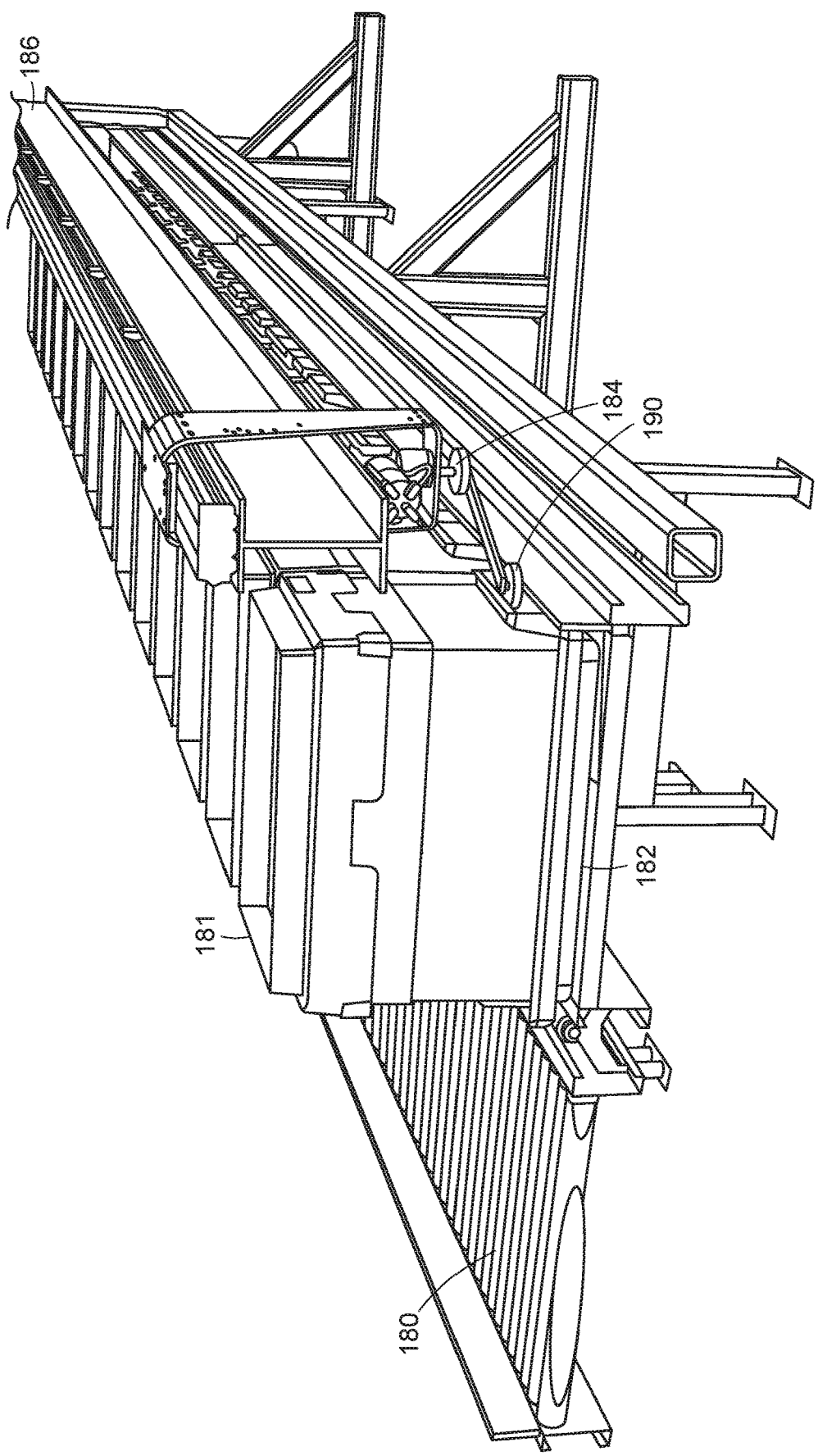
Figure 22C:
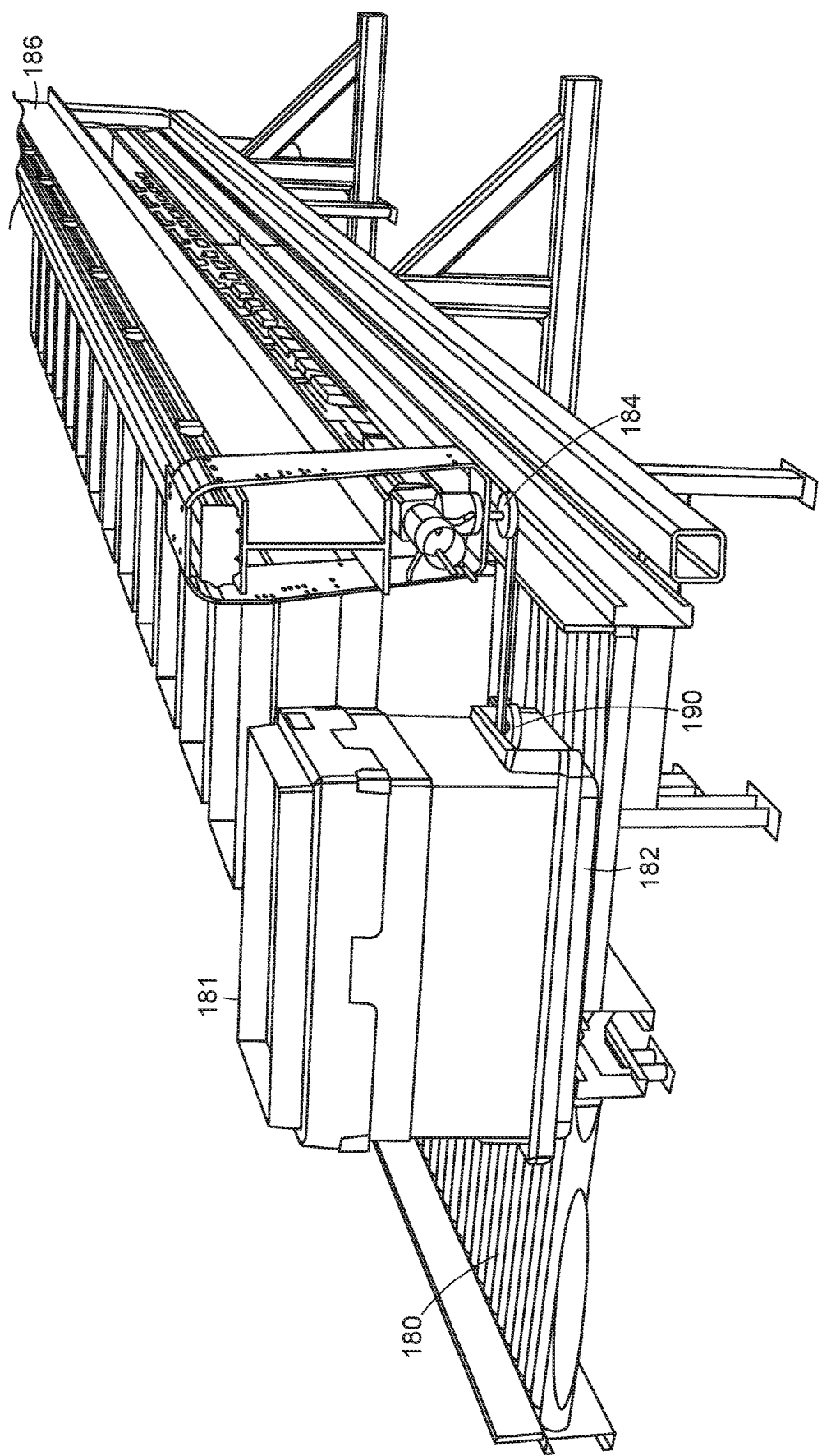
Figure 22D:
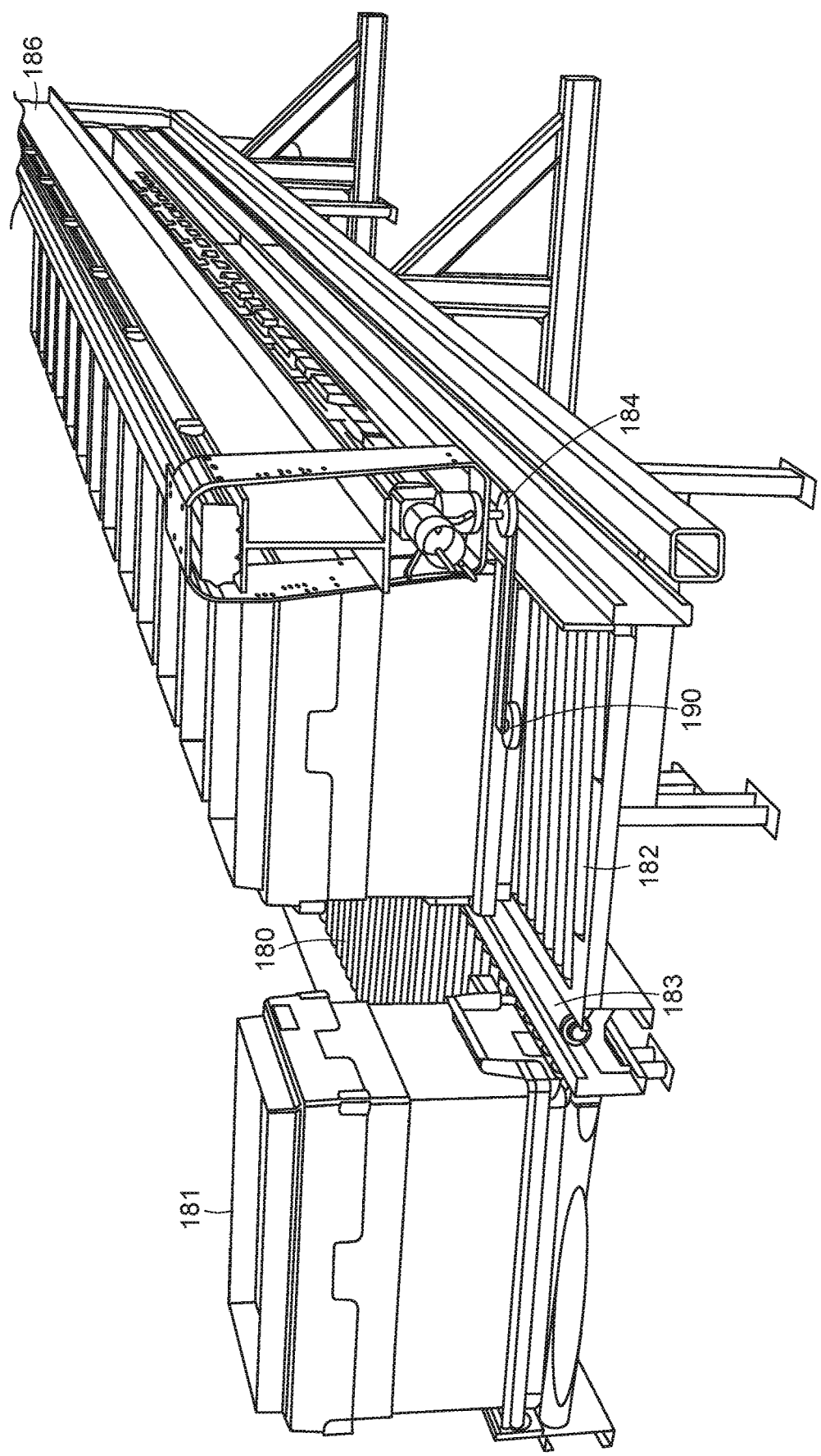

With reference to FIGS. 22A-22D, a box kicker 184 in accordance with an embodiment of the present invention may be suspended by and travel along a track 86, and may include a rotatable arm 88 and a roller wheel 190 at the end of the arm 88. With reference to FIGS. 22B-22D, when the roller wheel 190 contacts the kicker plate 151 (shown in FIG. 20) of a box tray assembly 120, the arm 188 continues to rotate, urging the box tray assembly 180 from a first conveyor 182 to a second conveyor 180. Again, the roller wheel 190 is designed to contact the kicker plate 151 of a box tray assembly 181 to push the box tray assembly 181 onto the conveyor 180. Such a system may be used to provide that boxes that are empty or finished being unloaded may be removed (e.g., from conveyor 182), or that boxes that are full or finished being loaded may be removed (e.g., from conveyor 182). The conveyors 180, 182 may also be coplanar, and the system may further include transition roller 183 to facilitate movement of the box tray assembly 181, e.g., by being activated to pull the box tray over to the conveyor 180.

Figure 23:
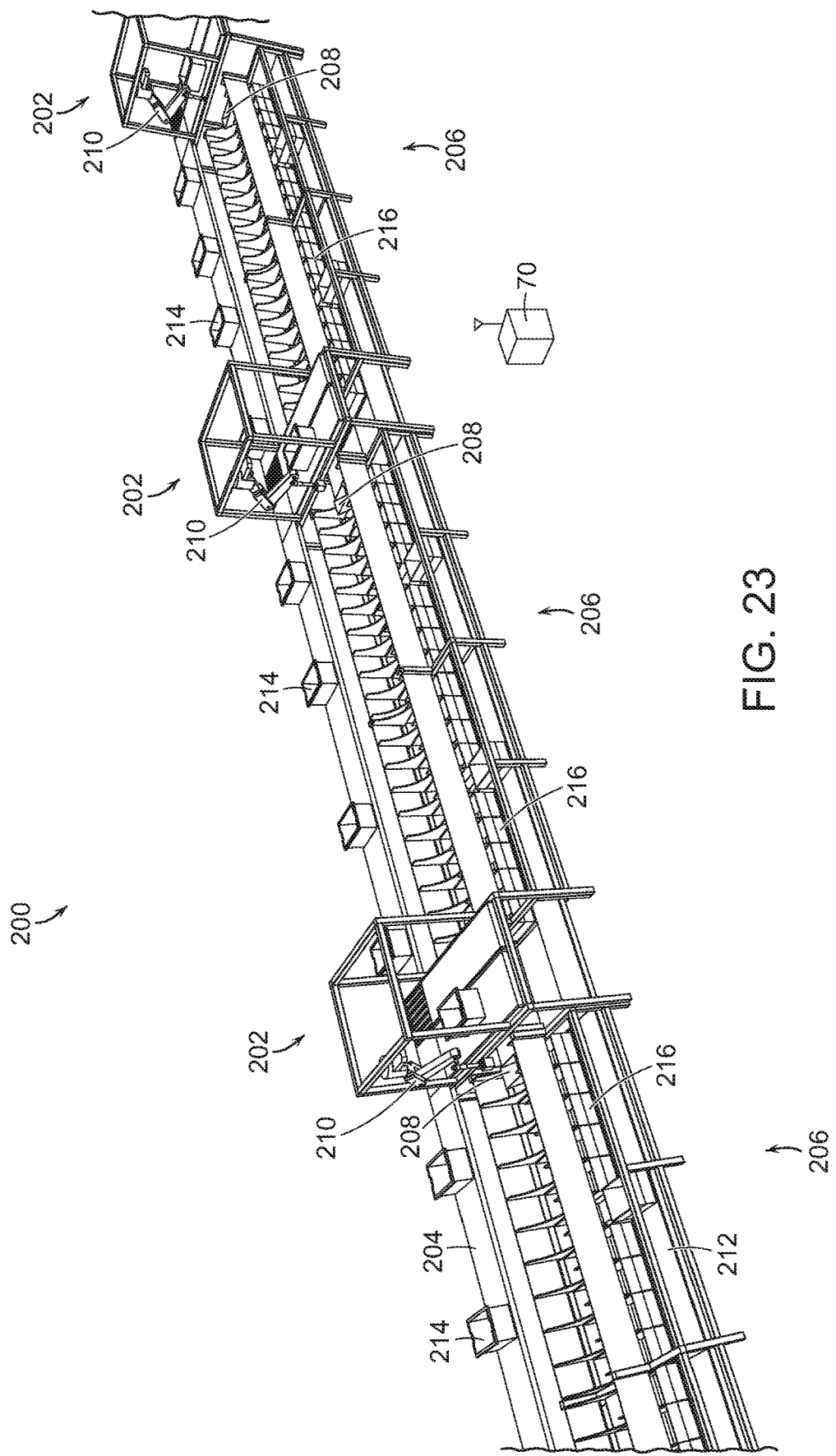
FIG. 23 shows an illustrative diagrammatic view of an object processing system in accordance with a further embodiment of the present invention employing a plurality of storage sections, processing sections, and a plurality of destination sections.

Systems of the invention are highly scalable in terms of sorts-per-hour as well as the number of storage bins and destination bins that may be available. FIG. 23 shows a system 200 in accordance with a further embodiment of the present invention that includes plurality of processing sections 202 that access a common input conveyor 204, and a plurality of destination sections 206 for receiving objects via a shuttle carrier 208. Generally, each processing section 202 includes a programmable motion device 210 that provides objects to a shuttle carrier 208 of one or more processing sections. Supply bins 214 are provided on the input conveyor 204, and destination bins 216 are provided at the destination sections 206 and are accessible by a shuttle carrier 208.

Figure 24:
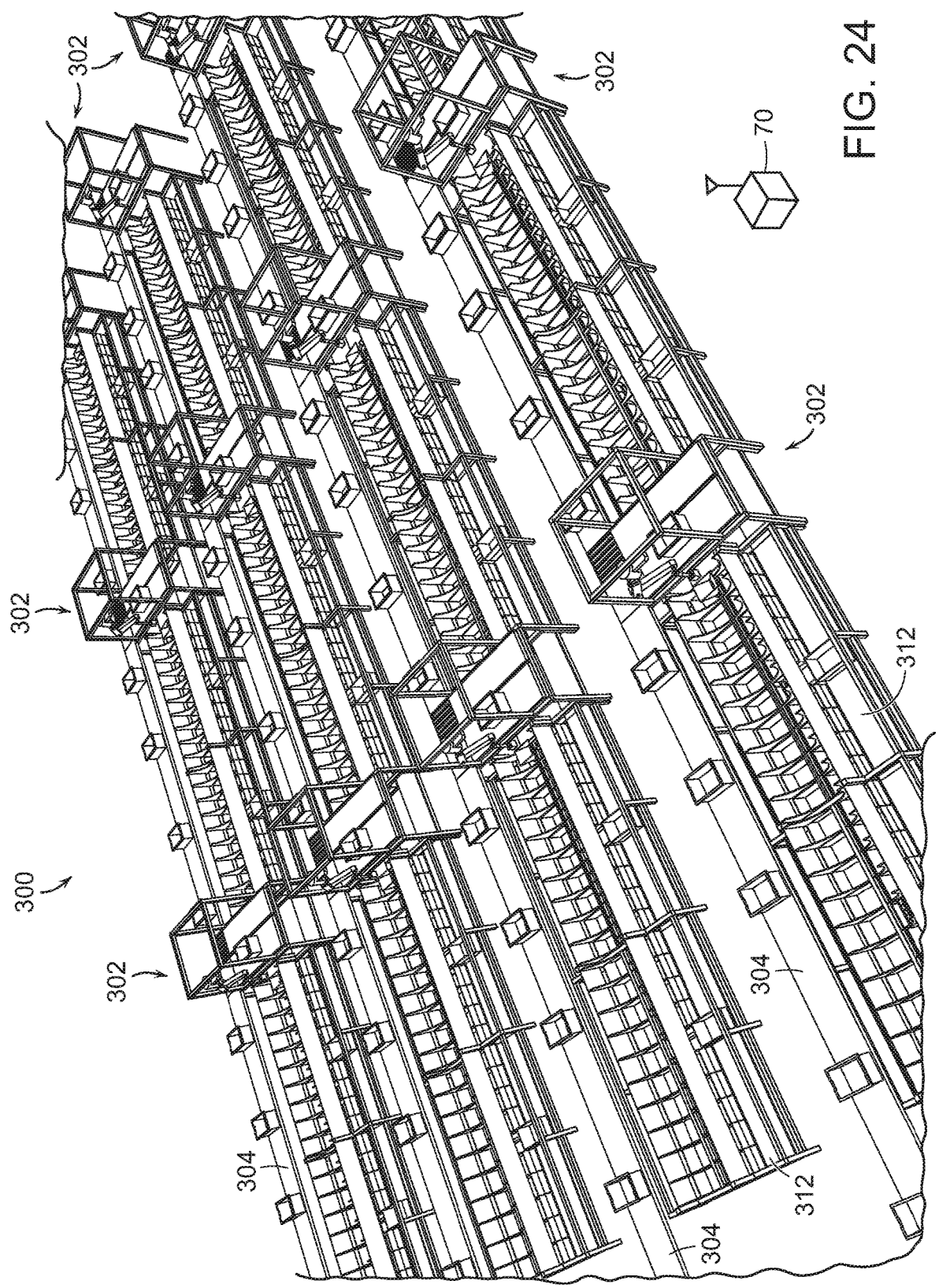
FIG. 24 shows an illustrative diagrammatic view of an object processing system in accordance with a further embodiment of the present invention employing further pluralities of storage sections, processing sections and destination sections.

FIG. 24 shows a system 300 in accordance with a further embodiment of the present invention that includes a further plurality of many rows of sets of processing sections 302 that access one of a plurality of input conveyors 304, and process objects to be placed in any of a variety of destination bins via a plurality of programmable motion devices and a plurality of shuttle carriers that bring objects to desired destinations that are then provided to an output conveyor 348.

Control of each of the systems 30, 30', 200 and 300 may be provided by the computer system 70 that is in communication with the storage conveyors and displacement mechanism(s), the processing conveyors and displacement mechanism(s), and the programmable motion device(s). The computer system 70 also contains the knowledge (continuously updated) of the location and identity of each of the storage bins, and contains the knowledge (also continuously updated) of the location and identity of each of the destination bins. The system therefore, directs the movement of the storage bins and the destination bins, and retrieves objects from the storage bins, and distributes the objects to the destination bins in accordance with an overall manifest that dictates which objects must be provided in which destination boxes for shipment, for example, to distribution or retail locations.

Those skilled in the art will appreciate that numerous modifications and variations may be made to the above disclosed embodiments without departing from the spirit and scope of the present invention.

What is claimed is:

1. A processing system for processing objects using a programmable motion device, said processing system comprising:
    a plurality of supply bins providing supply of a plurality of objects, said plurality of supply bins being provided with a bin conveyance system;
    a programmable motion device in communication with the bin conveyance system, said programmable motion device including an end effector for grasping and moving a selected object out of a selected supply bin;
    a plurality of destination containers provided on an infeed conveyor, wherein the infeed conveyor is sloped to gravity bias the plurality of destination containers toward the programmable motion device; and
    a movable carriage for receiving the selected object from the end effector of the programmable motion device, and for carrying the selected object to one of the plurality of destination containers on the infeed conveyor.

2. The processing system as claimed in claim 1, wherein the movable carriage reciprocally moves between two rows of infeed conveyors holding the plurality of destination containers.

3. The processing system as claimed in claim 1, wherein the movable carriage is adapted to drop the selected object into a selected destination container.

4. The processing system as claimed in claim 1, wherein the destination containers are provided adjacent to an output conveyor.

5. The processing system as claimed in claim 1, wherein the processing system further includes at least one further programmable motion device for grasping and moving a further selected object out of a further selected storage bin, and for providing the further selected object to a further movable carriage.

6. The processing system as claimed in claim 1, further comprising an infeed sensor that senses an identity of a destination container moving past the infeed sensor in order to index a location of each destination container on the infeed conveyor.

7. The processing system as claimed in claim 1, wherein the infeed conveyor terminates adjacent the programmable motion device.

8. The processing system as claimed in claim 1, further comprising a carriage rail between parallel rows of the destination containers, wherein a single movable carriage is positioned on the rail.

9. The processing system as claimed in claim 1, wherein the bin conveyance system includes a diverter for selectively providing a supply bin to the programmable motion device.

10. The processing system as claimed in claim 9, wherein the programmable motion device includes an articulated arm, and wherein the articulated arm is positioned adjacent to the diverter.

11. The processing system as claimed in claim 1, wherein the processing system further includes a container displacement system for displacing each destination container onto an output conveyor.

12. The processing system as claimed in claim 11, wherein the output conveyor is gravity biased to provide a destination container thereon to a further processing location.

13. The processing system as claimed in claim 12, wherein the further processing location is a shipment transport location.

14. The processing system as claimed in claim 11, wherein one or more of the plurality of destination containers positioned higher on the sloped infeed conveyor are gravity biased to move toward the programmable motion device to fill a space left by the displaced destination container.

15. The processing system as claimed in claim 14, wherein a new destination container is provided at the top of the sloped infeed conveyor to move down the sloped infeed conveyor and refill the destination containers.

16. The processing system as claimed in claim 14, further comprising an infeed sensor that senses an identity of each destination container moving past the infeed sensor in order to index a location of each destination container on the infeed conveyor.

17. A processing system for processing objects using a programmable motion device, said processing system comprising:
a programmable motion device including an end effector for grasping and moving a selected object from a plurality of objects;
a movable carriage for receiving the selected object from the end effector of the programmable motion device, and for carrying the selected object to one of a plurality of destination containers; and
a destination container displacement system for urging a selected destination container onto an output conveyor;
wherein the movable carriage reciprocally moves between two parallel rows of the destination containers, and wherein the movable carriage pivots towards one of the two rows of destination containers to drop the selected object into a selected destination containers.

18. The processing system as claimed in claim 17, wherein the two rows of destination container are provided adjacent to the output conveyor.

19. The processing system as claimed in claim 17, wherein the output conveyor is gravity biased to provide a destination container thereon to a further processing location.

20. The processing system as claimed in claim 17, wherein the processing system further includes at least one further programmable motion device for grasping and moving a further selected object from the plurality of objects, and for providing the further selected object to a further movable carriage.

21. The processing system as claimed in claim 17, wherein the system further includes a plurality of supply bins providing supply of the plurality of objects.

22. The processing system as claimed in claim 21, wherein the plurality of supply bins are provided with a bin conveyance system.

23. The processing system as claimed in claim 22, wherein the bin conveyance system includes a diverter for selectively providing a supply bin to the programmable motion device.

24. The processing system as claimed in claim 23, wherein the programmable motion device includes an articulated arm, and wherein the articulated arm is positioned adjacent to the diverter.

25. A method of processing of objects, said method comprising the steps of:
providing a plurality of supply bins including a plurality of objects, said plurality of supply bins being provided with a bin conveyance system;
providing a plurality of destination containers on a pair of infeed conveyors, each infeed conveyor being adjacent an outfeed conveyor;
grasping and moving a selected object out of a selected supply bin using a programmable motion device;
providing the selected object to a reciprocating carriage;
carrying the selected object to a selected one of the plurality of destination containers using the reciprocating carriage;
depositing the selected object from the reciprocating carriage to the selected destination container;
displacing the selected destination container onto an output conveyor with a displacement device; and
collapsing the destination containers that are upstream to the displaced destination carrier in the downstream direction to fill a space left by the selected displaced destination container.

26. The method as claimed in claim 25, wherein the method further includes the step of selectively diverting a supply bin to the programmable motion device.

27. The method as claimed in claim 25, wherein the reciprocating carriage reciprocally moves between two rows of the destination bins.

28. The method as claimed in claim 25, wherein the reciprocating carriage is adapted to drop objects, and the step of depositing includes dropping the selected object into the selected destination container.

29. The method as claimed in claim 25, wherein each infeed conveyor is sloped toward a programmable motion device, and the step of collapsing includes gravity biasing the destination containers toward the programmable motion device.

30. The method as claimed in claim 25, wherein the output conveyor is gravity biased to provide a destination container thereon to a further processing location.

31. The method as claimed in claim 30, wherein the further processing location is a shipment transport location.

32. The method as claimed in claim 25, wherein the step of displacing each destination container onto an output conveyor includes actuating a rotatable box kicker to engage and push a destination container onto the output conveyor.

33. The method as claimed in claim 32, wherein the box kicker is mounted on a rail positioned between the parallel infeed conveyors.

\* \* \* \* \*